(12) United States Patent
Yamauchi

(10) Patent No.: US 12,714,133 B2
(45) Date of Patent: Aug. 25, 2026

(54) METHOD FOR PRODUCING TOBACCO FLAVOR LIQUID, TOBACCO FLAVOR LIQUID, METHOD FOR PRODUCING ESTER COMPOUND, AND SMOKING ARTICLE

(71) Applicant: JAPAN TOBACCO INC., Tokyo (JP)

(72) Inventor: Shun Yamauchi, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 1154 days.

(21) Appl. No.: 17/222,188

(22) Filed: Apr. 5, 2021

(65) Prior Publication Data

US 2021/0219596 A1 Jul. 22, 2021

Related U.S. Application Data

(63) Continuation of application No. PCT/JP2019/039683, filed on Oct. 8, 2019.

(30) Foreign Application Priority Data

Oct. 9, 2018 (JP) ................................ 2018-191165

(51) Int. Cl.
*A24B 15/24* (2006.01)
*A24B 15/167* (2020.01)
(Continued)

(52) U.S. Cl.
CPC .......... *A24B 15/241* (2013.01); *A24B 15/167* (2016.11); *A24B 15/26* (2013.01); *C07B 41/12* (2013.01)

(58) Field of Classification Search
None
See application file for complete search history.

(56) References Cited

U.S. PATENT DOCUMENTS

2012/0138074 A1 6/2012 Cantrell et al.
2015/0201669 A1 7/2015 Junker et al.
(Continued)

FOREIGN PATENT DOCUMENTS

CN 107660817 A 2/2018
EP 2944697 A1 11/2015
(Continued)

OTHER PUBLICATIONS

International Search Report, issued in PCT/JP2019/039683, PCT/ISA/210, dated Nov. 12, 2019.
(Continued)

*Primary Examiner* — Katherine A Will
(74) *Attorney, Agent, or Firm* — Birch, Stewart, Kolasch & Birch, LLP

(57) ABSTRACT

The purpose of the present invention is to provide a method for producing a tobacco flavor liquid that is useful for smoking articles, the tobacco flavor liquid, a method for producing an ester compound, and a smoking article that contains the tobacco flavor liquid.

The method according to the present embodiment for producing a tobacco flavor liquid comprises: extracting a component from a starting tobacco material using an organic solvent to give a tobacco component-containing liquid; and, in an oxygen-containing atmosphere, mixing the tobacco component-containing liquid with an aqueous solution, which contains a basic substance and an alcohol, and reacting therewith to thereby give a tobacco flavor liquid.

13 Claims, 21 Drawing Sheets

(51) Int. Cl.
*A24B 15/26* (2006.01)
*C07B 41/12* (2006.01)

(56) References Cited

U.S. PATENT DOCUMENTS

| | | | | |
|---|---|---|---|---|
| 2017/0260553 | A1 | 9/2017 | Haas et al. | |
| 2018/0070627 | A1* | 3/2018 | Burton | B01D 15/361 |

FOREIGN PATENT DOCUMENTS

| | | | |
|---|---|---|---|
| JP | 53-12899 | A | 2/1978 |
| JP | 2013-544523 | A | 12/2013 |
| JP | 2017-502681 | A | 1/2017 |
| JP | 2017-516470 | A | 6/2017 |
| KR | 10-0583887 | B1 | 5/2006 |

OTHER PUBLICATIONS

Written Opinion of the International Searching Authority, issued in PCT/JP2019/039683, PCT/ISA/237, dated Nov. 12, 2019.

Extended European Search Report issued Jun. 7, 2022, in European Patent Application No. 19870929.7.

English translation of International Preliminary Report on Patentability and Written Opinion mailed Apr. 22, 2021, in PCT/JP2019/039683.

Office Action issued Sep. 30, 2021, in Russian Patent Application No. 2021111305/03(024206).

Office Action issued Feb. 22, 2022, in Japanese Patent Application No. 2020-551172.

* cited by examiner

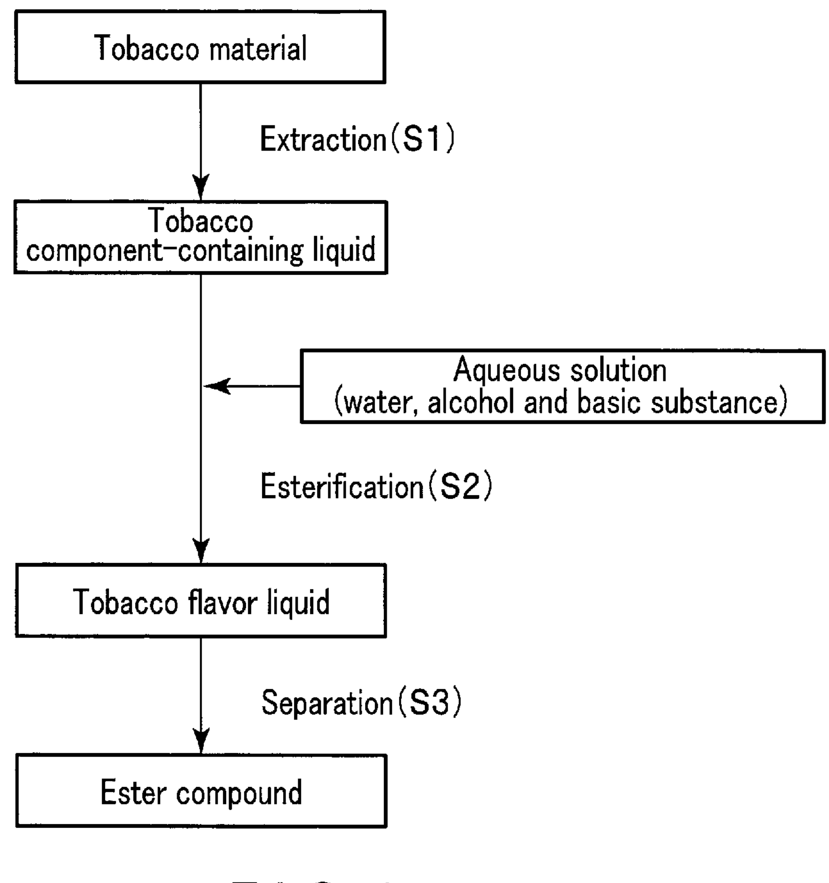
F I G. 1

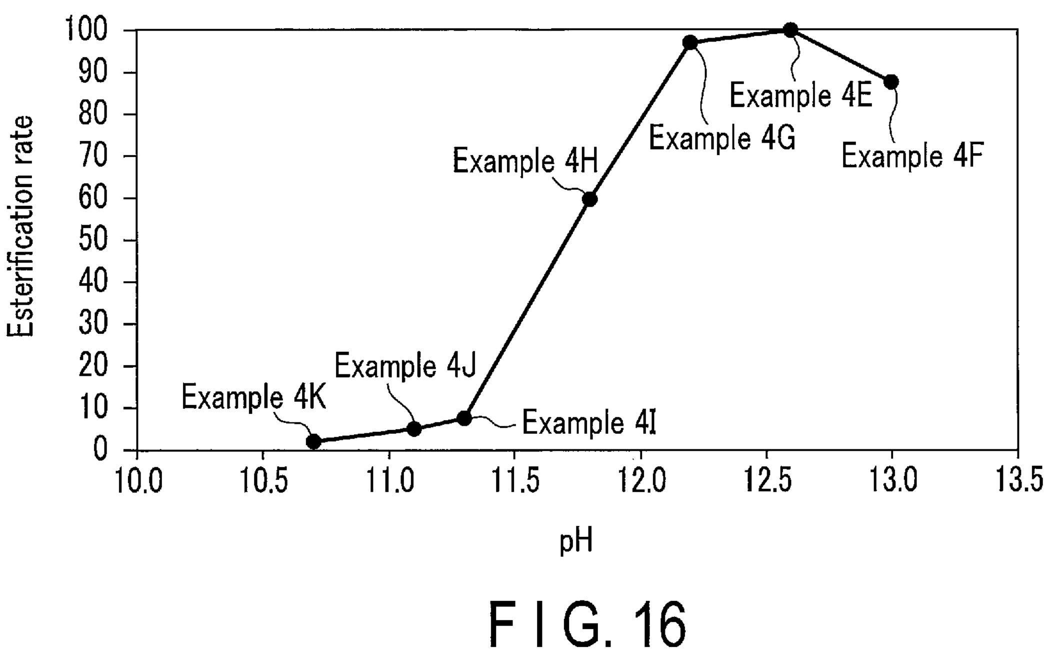
F I G. 16

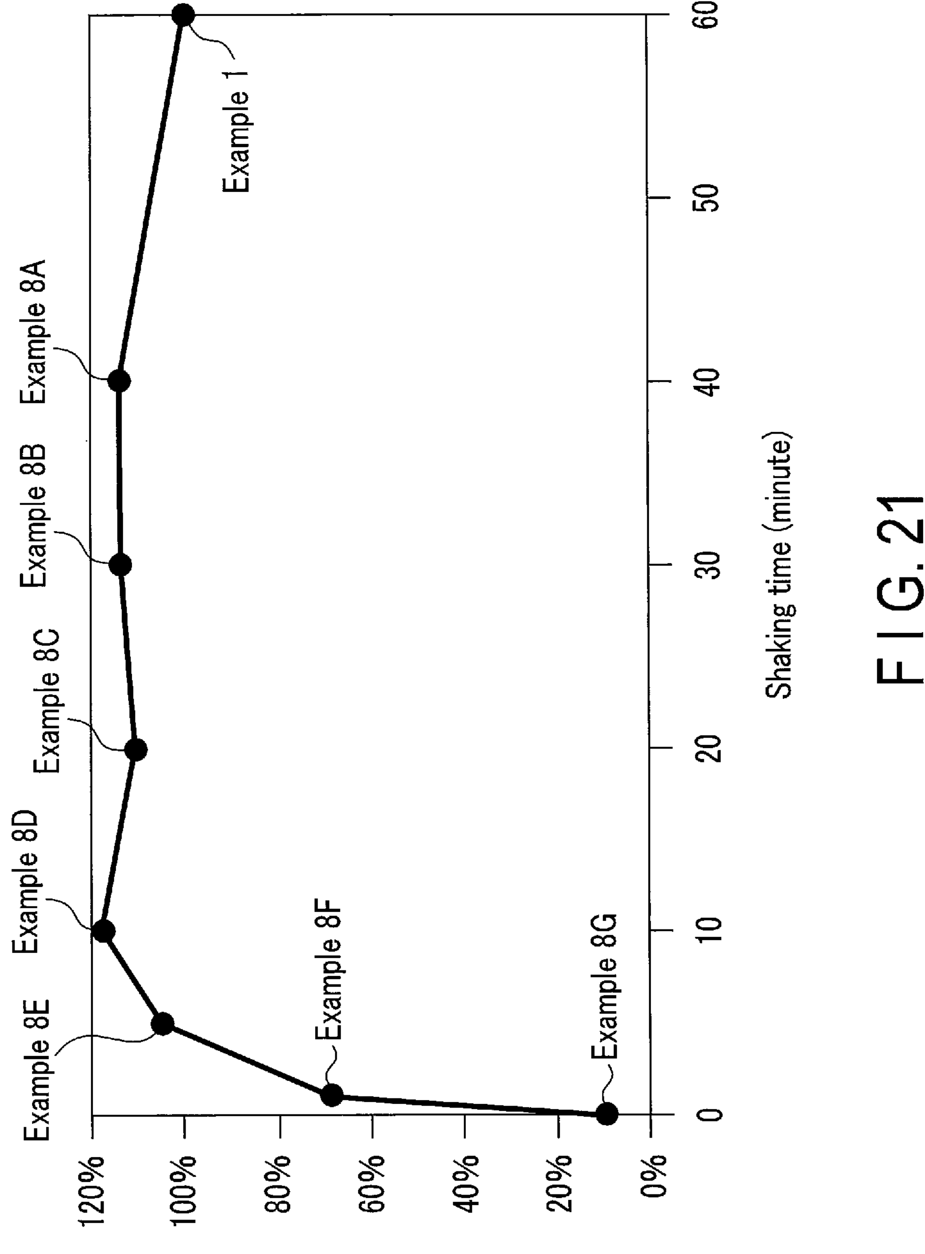
F I G. 21

METHOD FOR PRODUCING TOBACCO FLAVOR LIQUID, TOBACCO FLAVOR LIQUID, METHOD FOR PRODUCING ESTER COMPOUND, AND SMOKING ARTICLE

CROSS REFERENCE TO RELATED APPLICATIONS

This application is a Continuation Application of PCT Application No. PCT/JP2019/039683, filed Oct. 8, 2019 and based upon and claiming the benefit of priority from Japanese Patent Application No. 2018-191165, filed Oct. 9, 2018, the entire contents of all of which are incorporated herein by reference.

BACKGROUND OF THE INVENTION

1. Field of the Invention

The present invention relates to a method for producing a tobacco flavor liquid used in smoking articles, a tobacco flavor liquid, a method for producing an ester compound, and a smoking article.

2. Description of the Related Art

For example, Jpn. PCT National Publication No. 2017-502681, an item of Japanese patent literature, discloses a process for producing flavorants and related materials. This literature discloses that over the years various treatment methods and additives have been proposed for altering the overall character or nature of tobacco materials utilized in tobacco products.

SUMMARY OF THE INVENTION

In fields of smoking article manufacture and the like, a new preparation process to prepare a material useful as a flavorant from tobacco, that is, a plant included in genus *Nicotiana*, has been a perennial demand.

An object of the present invention is to provide a method for producing a tobacco flavor liquid that is useful for smoking articles, a tobacco flavor liquid, a method for producing an ester compound, and a smoking article that contains the tobacco flavor liquid.

A method for producing a tobacco flavor liquid according to an embodiment of the present invention includes: extracting a component from a starting tobacco material using an organic solvent to thereby obtain a tobacco component-containing liquid; and mixing the tobacco component-containing liquid with an aqueous solution containing a basic substance and an alcohol in an oxygen-containing atmosphere to react the tobacco component-containing liquid with the aqueous solution, thereby obtaining a tobacco flavor liquid.

A tobacco flavor liquid according to an embodiment of the present invention is produced by the above-described method for producing a tobacco flavor liquid.

A method for producing an ester compound according to an embodiment of the present invention includes: extracting a component from a starting tobacco material using an organic solvent to thereby obtain a tobacco component-containing liquid; reacting the tobacco component-containing liquid with an aqueous solution containing a basic substance and an alcohol in an oxygen-containing atmosphere to thereby obtain a tobacco flavor liquid; and separating an ester compound from the tobacco flavor liquid.

A smoking article according to an embodiment of the present invention includes the above tobacco flavor liquid.

According to the present invention, it is possible to provide a method for producing a tobacco flavor liquid that is useful for smoking articles, a tobacco flavor liquid, a method for producing an ester compound, and a smoking article that contains the tobacco flavor liquid.

BRIEF DESCRIPTION OF THE DRAWINGS

FIG. 1 is a flowchart showing a preferred embodiment of a method of the present invention.

FIG. 16 is a graph showing numerical values of the peak heights of 3MVA-ethyl ester obtained by GC-MS analysis of Examples 4E to 4K when the peak height of 3MVA-ethyl ester obtained by GC-MS analysis of Example 4E is set to 100.

FIG. 21 is a line graph showing the results shown in FIG. 20.

DESCRIPTION OF THE PREFERRED EMBODIMENTS

Figure 2:
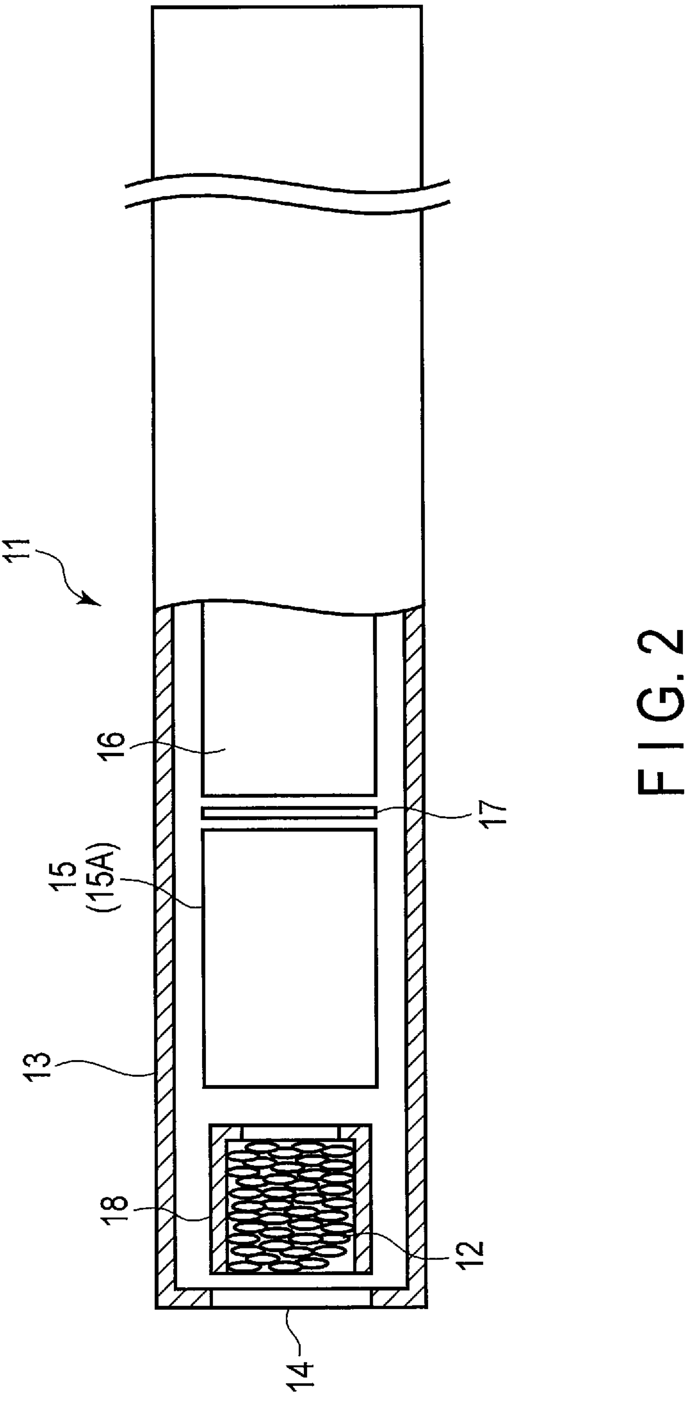
FIG. 2 is a cross-sectional view showing an example of a heating-type flavor inhaler containing a tobacco filler.

Hereinafter, the present invention will be described in detail; however, the description provided below is intended to describe the present invention and not intended to limit the present invention.

1. Method for Producing Tobacco Flavor Liquid

According to an embodiment, a method for producing a tobacco flavor liquid includes:

(S1) extracting a component from a starting tobacco material using an organic solvent to thereby obtain a tobacco component-containing liquid; and (S2) mixing the tobacco component-containing liquid with an aqueous solution containing a basic substance and an alcohol in an oxygen-containing atmosphere to react the tobacco component-containing liquid with the aqueous solution, thereby obtaining a tobacco flavor liquid.

The above embodiment may further include:

(S3) separating an ester compound from the tobacco flavor liquid.

The preferred embodiment described above is shown in FIG. 1. Hereinafter, the preferred embodiment will be described in the order of steps (S1) to (S3) with reference to FIG. 1.

[Extraction Step (S1)]

A component contained in a starting tobacco material is extracted from the starting tobacco material using an organic solvent to obtain a tobacco component-containing liquid and a tobacco residue.

The starting tobacco material may be a harvested leaf (tobacco leaf) just harvested on a farm, leaf tobacco resulting from harvested leaves dried on a farm, or cut tobacco ready to be blended into a tobacco product after subjection to a farm drying process, a subsequent long-term aging process of one to several years in a raw material plant, and a subsequent processing treatment in a manufacturing plant. As the starting tobacco material, a harvested leaf just harvested on a farm can be suitably used. As the starting tobacco material, a harvested leaf after a predetermined lapse of time post-harvest may also be used. In this specification, a dried starting tobacco material is referred to as "leaf tobacco", and a starting tobacco material being cultivated and dried is referred to as a "tobacco leaf".

As the starting tobacco material (harvested leaf), a tobacco leaf containing large amounts of organic acids, for example, a tobacco leaf containing 0.5 mg/g to 1.5 mg/g of 3-methylvaleric acid and 0.05 mg/g to 0.3 mg/g of isovaleric acid, may be used. Any variety of starting tobacco materials (harvested leaves) may be used. As the starting tobacco material, for example, Oriental species, yellow species, burley species, native species, wild tobacco species and the like can be used. Among these, the Oriental species and the native species have a relatively large content of valeric acid per unit weight and can be suitably used in the method for producing a tobacco flavor liquid of the present embodiment. Among these, the Oriental species has the largest content of valeric acid per unit weight and can be most suitably used in the method for producing a tobacco flavor liquid of the present embodiment. As the starting tobacco material, a single variety of starting tobacco material or a mixture of different starting tobacco material varieties may be used.

The extraction step may be performed in any atmosphere. The extraction step can be performed in an oxygen-containing atmosphere such as an air atmosphere. The extraction step may be performed in an atmosphere other than an oxygen-containing atmosphere, for example, in a nitrogen atmosphere. The extraction step may be performed in a high-pressure and low-pressure air atmosphere.

The temperature in the extraction step is, for example, a temperature of 0° C. to 90° C., more preferably a temperature of 10° C. to 70° C., for example, and most preferably a temperature of 15° C. to 60° C. The temperature in the extraction step is preferably lower than a boiling point of an organic solvent used for the extraction.

The extraction step can be performed by immersing the starting tobacco material in an organic solvent for a period of, for example, 30 seconds to several days, more preferably 1 minute to 12 hours, and most preferably 5 minutes to 3 hours. In the extraction step, shaking or stirring may be appropriately performed.

An organic solvent used in the extraction step preferably has a relatively low polarity and boiling point. Hexane is preferably used as such an organic solvent. The organic solvent used in the extraction step is not limited to hexane and may be an organic solvent other than hexane. For example, ethyl acetate may be used.

In the extraction step, the organic solvent is preferably used in an amount in the range of 0.5 L to 3.0 L with respect to 1 kg of starting tobacco material, and more preferably used in an amount in the range of 1.0 L to 2.0 L with respect to 1 kg of starting tobacco material. The volume of the solvent or solution refers to the volume at 25° C. When the amount of the organic solvent is too small, it is difficult to sufficiently extract components, which will be described later, from the starting tobacco material. When the amount of the organic solvent is too large, the concentration of the components in a first tobacco component-containing liquid described later becomes low. When the first tobacco component-containing liquid containing the above components at a low concentration is used in the esterification step (S2), it is difficult to cause esterification with high efficiency. Also, when the first tobacco component-containing liquid contains the above components at a low concentration, a large amount of organic solvent needs to be removed in order to obtain a concentrated dry solid product from the first tobacco component-containing liquid.

The components contained in the starting tobacco material include, for example, organic acids, specifically valeric acid, hexanoic acid, and the like.

After completion of the extraction step, the tobacco component-containing liquid (first tobacco component-containing liquid) and the tobacco residue are separated from each other. The tobacco residue is used, for example, in a subsequent step as a substrate for reapplication of a tobacco flavor liquid. The tobacco residue may be dried and then used as a substrate for supporting a flavorant. Alternatively, the tobacco residue may be molded into a molding to be used as a substrate for supporting a flavorant. The molding of the tobacco residue may be a sheet-like molding, cut pieces obtained by cutting a sheet-like molding into a shape of cut tobacco, or powder obtained by pulverizing a sheet-like molding. The sheet-like molding can be prepared by, for example, molding the tobacco residue into a sheet shape using a paper-making technique.

The tobacco component-containing liquid (first tobacco component-containing liquid) may undergo a filtration step in which the tobacco component-containing liquid is filtered through filter paper or the like. The filtration step is optional. Alternatively, a filtrate obtained by filtering the tobacco component-containing liquid may be concentrated to dryness to obtain a concentrated dry solid product. Concentration to dry and solid state can be performed by drying under reduced pressure using an evaporator or a centrifugal evaporator. Alternatively, concentration to dry and solid state can be performed by freeze drying or heat drying. The concentrated dry solid product may be dissolved again in the organic solvent (e.g., hexane) used for the extraction or dissolved in a different organic solvent, to be used as a tobacco component-containing liquid (second tobacco component-containing liquid). The amount of the organic solvent used to obtain the second tobacco component-containing liquid is preferably in the range of 500 mL to 10000 mL, and more preferably in the range of 1000 mL to 6000 mL with respect to 1 g of the concentrated dry solid product.

[Esterification Step (S2)]

In the esterification step (S2), an aqueous solution is added, in an oxygen-containing atmosphere, to a predetermined amount of tobacco component-containing liquid (the first tobacco component-containing liquid or the second tobacco component-containing liquid) obtained in the extraction step (S1) and reacted with the tobacco component-containing liquid, thereby generating an ester compound in the mixed solution of the aqueous solution and the tobacco component-containing liquid. As a result, a tobacco flavor liquid with an increased amount of ester compound can be obtained. The tobacco component-containing liquid and the aqueous solution are preferably mixed at a volume ratio of 4:1 to 4:5, more preferably mixed at a volume ratio of 4:1 to 4:3, and most preferably mixed at a volume ratio of 5:2 to 4:3. The mixed solution is separated into two phases of, for example, an organic solvent phase formed of the tobacco component-containing liquid and an aqueous phase formed of the aqueous solution in a standing state. In this case, although it differs depending on the type of the organic solvent and the like, according to one example, the organic solvent phase is the upper layer and the aqueous phase is the lower layer.

The tobacco component-containing liquid used in the esterification step (S2) contains the above components (i.e., organic acids such as valeric acid and hexanoic acid) extracted from the starting tobacco material preferably at a concentration of 0.1 mg/L to 5000 mg/L, and more preferably at a concentration of 0.5 mg/L to 500 mg/L.

As the organic solvent included in the tobacco component-containing liquid used in the esterification step (S2), one selected from the group consisting of hexane, pentane, diethyl ether, TBME (t-butyl methyl ether), and ethyl acetate may be used. The organic solvent included in the tobacco component-containing liquid used in the esterification step (S2) preferably has a property of not mixing into water (aqueous solution), that is, immiscibility with water (aqueous solution). The organic solvent included in the tobacco component-containing liquid used in the esterification step (S2) may be either the same as or different from the organic solvent used as an extraction solvent in the extraction step (S1).

The polarity of the organic solvents included in the above group has a relationship of hexane/pentane<diethyl ether<TBME<ethyl acetate. Thus, among these organic solvents, hexane and pentane have the lowest polarity, and have a property of not mixing into water (aqueous solution) at the highest level, that is, the highest immiscibility with water (aqueous solution). Among these organic solvents, diethyl ether also has a relatively low polarity, and has a property of not mixing into water (aqueous solution), that is, immiscibility with water (aqueous solution). Among these organic solvents, TBME has a relatively high polarity and has a property of mixing well into water (aqueous solution), that is, miscibility with water (aqueous solution). Among these organic solvents, ethyl acetate has the highest polarity, and has a property of mixing well into water (aqueous solution) at the highest level, that is, the highest miscibility with water (aqueous solution).

The organic solvent contained in the tobacco component-containing liquid used in the esterification step (S2) may be a mixture of two or more selected from the above group and immiscible with water (aqueous solution). Each compound included in the mixture is preferably immiscible with water (aqueous solution). However, as long as the mixture is immiscible with water (aqueous solution), some of the compounds included in the mixture may be miscible with water (aqueous solution).

The aqueous solution may be formed of an alcohol and a water solution containing a basic substance. The water solution of a basic substance and the alcohol in the aqueous solution are preferably uniformly mixed. The water solution of a basic substance and the alcohol may be mixed at a volume ratio of 1:1, for example, or mixed at other ratios. The water solution of a basic substance and the alcohol are preferably mixed at a volume ratio of 10:1 to 1:4, and more preferably mixed at a volume ratio of 5:3 to 1:2.

The alcohol may be any alcohol. As the alcohol, a primary alcohol is preferably used. As the alcohol, a monohydric alcohol is preferably used. For example, a lower alcohol having a small number of carbon atoms such as a carbon number of 4 or less, or 5 or less can be suitably used as the alcohol. A lower alcohol is suitably used in the esterification step of the present embodiment because of its high solubility in water. As the alcohol, one selected from the group consisting of ethanol, methanol, 1-propanol and 1-butanol may be used. As the alcohol, a mixture of two or more selected from the above group may be used.

In the esterification step (S2), a proportion of the volume of the alcohol in the total of the volume of the tobacco component-containing liquid (the first tobacco component-containing liquid or the second tobacco component-containing liquid) and the volume of the aqueous solution is preferably 2.0% to 28.6%. In the esterification step (S2), a proportion of the volume of the alcohol in the total of the volume of the tobacco component-containing liquid (the first tobacco component-containing liquid or the second tobacco component-containing liquid) and the volume of the aqueous solution is more preferably 10.7% to 28.6%.

The basic substance is preferably strongly basic with a degree of ionization close to 1. The basic substance is preferably formed of a hydroxide of an alkali metal or an alkaline earth metal. For example, sodium hydroxide or potassium hydroxide may be used as the hydroxide of an alkali metal. For example, calcium hydroxide may be used as the hydroxide of an alkaline earth metal. The basic substance is preferably present in the water solution of the basic substance at a concentration of 0.01 N to 5 N, and more preferably present in the water solution of the basic substance at a concentration of 0.05 N to 0.5 N.

The pH of the water solution of the basic substance is preferably 11.0 to 14.0, and more preferably 12.0 to 13.0.

The reaction in the esterification step is caused in an oxygen-containing atmosphere, as described above. The oxygen-containing atmosphere is, for example, an air atmosphere. The oxygen-containing atmosphere preferably contains oxygen at a concentration of 20% by volume or more.

The temperature in the esterification step is preferably a temperature of 0° C. to 90° C., more preferably a temperature of 10° C. to 70° C., and most preferably a temperature of 15° C. to 60° C.

The reaction in the esterification step is performed preferably over a period of 1 minute or more, and more preferably over a period of 1 to 60 minutes. The reaction is still more preferably performed over a period of 5 to 60 minutes. The reaction is still more preferably performed over a period of 10 to 60 minutes. The reaction is preferably performed while shaking, and more preferably performed while shaking at 10 rpm to 300 rpm. The reaction is still more preferably performed while shaking at 100 rpm to 200 rpm.

When the reaction is performed over a certain period of time in this manner, an esterification reaction using an organic acid such as valeric acid or hexanoic acid as a substrate is promoted, and the amount of an ester compound corresponding to the type of alcohol added increases. That is, when ethanol is used as the alcohol, the amount of the organic acid decreases and various ethyl esters are generated instead. When methanol is used as the alcohol, the amount of the organic acid decreases and various methyl esters are generated instead. When 1-propanol is used as the alcohol, the amount of the organic acid decreases and various propyl esters are generated instead. When 1-butanol is used as the alcohol, the amount of the organic acid decreases and various butyl esters are generated instead.

The tobacco flavor liquid thus produced contains a large amount of ester compounds. It is known that, in general, ester compounds often have an aroma, although it varies depending on the type of organic acid serving as a substrate of the reaction.

The tobacco flavor liquid can be obtained from the mixed solution, for example, in the following procedure. First, after the shaking is complete, the mixed solution is allowed to stand for a predetermined time, for example, 5 to 10 minutes, and only the organic solvent phase as the upper layer is removed from the mixed solution separated into two phases. The organic solvent phase is concentrated to dry and solid state in the same manner as described in the extraction step, and the concentrated dry solid product is dissolved in another solvent, such as a nonaqueous solvent, for example, in an organic solvent, whereby a tobacco flavor liquid containing a large amount of ester compounds can be obtained. The organic solvent phase may be used as a tobacco flavor liquid. Such a tobacco flavor liquid can either be used as a flavor source in a heating-type flavor inhaler (described later) or sprinkled on a tobacco material (the above-described tobacco residue or the like) for a cigarette to enhance the flavor.

[Step of Separating Ester Compound (S3)]

To separate the ester compound from the tobacco flavor liquid, a known separation method may be used. For example, various kinds of chromatography and the like may be used as the separation method, and more preferably, column chromatography may be suitably used. Thereby, the ester compound can be separated and purified.

2. Tobacco Flavor Liquid

A tobacco flavor liquid produced by the method described in <1. Method for Producing Tobacco Flavor Liquid> above is provided. The tobacco flavor liquid may be used in such a manner that it is sprinkled on a tobacco filler used in a "heating-type flavor inhaler including a tobacco filler" described later. The tobacco filler is a residue or the like obtained in the extraction step (S1) described above; however, the tobacco flavor liquid is not necessarily applied to the tobacco filler.

Alternatively, the tobacco flavor liquid may be further subjected to various treatment steps or mixed with a tobacco component-containing liquid obtained through a separate step, and then used as a tobacco flavor liquid in a "heating-type flavor inhaler including a tobacco flavor liquid", to be described later.

3. Heating-Type Flavor Inhaler Containing Tobacco Filler

As an example of a smoking article containing a tobacco flavor liquid, a heating-type flavor inhaler is shown. A heating-type flavor inhaler 11 shown in FIG. 2 does not hold a tobacco flavor liquid in a liquid state, but includes a tobacco filler 12 sprinkled with a tobacco flavor liquid to enhance the tobacco flavor.

The heating-type flavor inhaler 11 includes a housing 13, a mouthpiece 14, and a vent hole (not shown). The heating-type flavor inhaler 11 includes, in the housing 13, the tobacco filler 12, an aerosol source storage 15, a battery 16, a control circuit 17, a heater (not shown), and a pressure-sensitive sensor (not shown). The control circuit 17 and the heater receive power supply from the battery 16. The pressure-sensitive sensor is connected to the control circuit 17 and receives power supply from the control circuit 17.

The tobacco filler 12 is formed by filling the inside of a cartridge 18 or the like with a product obtained by sprinkling the above-described tobacco residue with a tobacco flavor liquid. The tobacco filler 12 is provided near the mouthpiece 14. The aerosol source storage 15 includes a case 15A and an aerosol source filled in the case 15A. The aerosol source is formed of a liquid such as propylene glycol, glycerin, or a mixture thereof.

When a user starts inhaling by holding the vicinity of the mouthpiece 14 in his or her mouth, the negative pressure is sensed by the pressure-sensitive sensor. Triggered thereby, the control circuit 17 switches a switch (not shown) to energize the heater. As a result, the heater is driven to heat the aerosol source in the aerosol source storage 15 and thereby generate aerosol. When the user continues inhaling, the aerosol passes through the tobacco filler 12 together with the air flowing in from the vent hole. When the aerosol passes through the tobacco filler 12 on the mouthpiece 14 side, the tobacco flavor in the tobacco filler 12 is subsumed by the aerosol, so that the user can enjoy the tobacco flavor.

In the heating-type flavor inhaler 11 of the present embodiment, the aerosol source is stored in the aerosol source storage 15; however, the arrangement of the aerosol source is not limited thereto. The aerosol source may be applied and added directly to the tobacco filler 12. In this case, the heater is provided near the tobacco filler 12 and can directly heat the tobacco filler 12 to the extent that the tobacco filler 12 is not burned. As a result, an aerosol is generated from the aerosol source directly applied and added to the tobacco filler 12, and a tobacco flavor of the tobacco filler 12 is subsumed by the aerosol. The user can enjoy the tobacco flavor by inhaling the aerosol together with the air.

4. Heating-Type Flavor Inhaler Containing Tobacco Flavor Liquid

Figure 3:
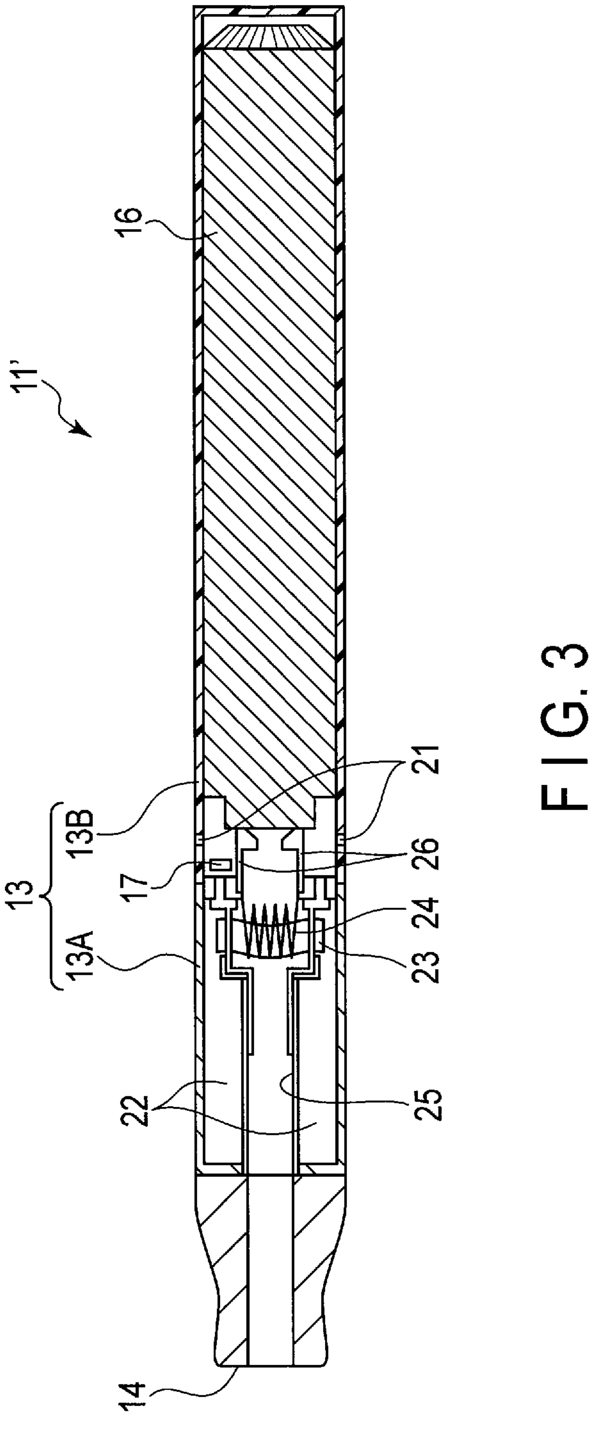
FIG. 3 is a cross-sectional view showing an example of a heating-type flavor inhaler containing a tobacco flavor liquid.

As an example of a smoking article containing a tobacco flavor liquid, a heating-type flavor inhaler 11' is shown. The heating-type flavor inhaler 11' shown in FIG. 3 does not contain the tobacco filler 12, unlike the heating-type flavor inhaler described in <3. Heating-type Flavor Inhaler Containing Tobacco Filler> above. A tobacco flavor can be obtained directly from the tobacco flavor liquid by atomizing the tobacco flavor liquid.

The heating-type flavor inhaler 11' includes a housing 13 including a first portion 13A and a second portion 13B, a mouthpiece 14, and a vent hole 21. The heating-type flavor inhaler 11' includes, in the housing 13, a tobacco flavor source 22, a battery 16, a control circuit 17, a wick 23, a heater 24 wound around the wick 23, a guide path 25 for guiding the air containing a tobacco flavor, a power line 26 for supplying power from the battery 16 to the heater 24, and a pressure-sensitive sensor (not shown). The control circuit 17 and the heater 24 receive power supply from the battery 16. The pressure-sensitive sensor is connected to the control circuit 17 and receives power supply from the control circuit 17. The tobacco flavor source 22 is formed by filling the inside of a case with a liquid. The liquid is formed by mixing a tobacco flavor liquid and an aerosol source. The aerosol source is formed of a liquid of, for example, propylene glycol, glycerin, or a mixture thereof.

The liquid stored inside the tobacco flavor source 22 is sucked up by the wick 23. When a user starts inhaling by holding the mouthpiece 14 in his or her mouth, the negative pressure is sensed by the pressure-sensitive sensor. Triggered thereby, the control circuit 17 switches a switch (not shown) to energize the heater 24 to heat the wick 23, thereby generating an aerosol containing a tobacco flavor from the wick 23. When the user continues inhaling, the aerosol passes around the wick 23 together with the air flowing in from the vent hole 21. The air containing the aerosol is introduced into the oral cavity of the user through the guide path 25, so that the user can enjoy the tobacco flavor.

The tobacco flavor liquid used in the present heating-type flavor inhaler 11' may be the tobacco flavor liquid produced according to the method described in <1. Method for Producing Tobacco Flavor Liquid> above, or a tobacco flavor liquid newly prepared by mixing a separately prepared tobacco flavor liquid and the tobacco flavor liquid produced according to the method described in <1. Method for Producing Tobacco Flavor Liquid> above.

In the present embodiment, the heating-type flavor inhaler 11 containing the tobacco filler 12 sprinkled with a tobacco flavor liquid and the heating-type flavor inhaler 11' containing a tobacco flavor liquid in a liquid state have been described as smoking articles containing a tobacco flavor liquid. It goes without saying that the smoking article may be a so-called "general cigarette (paper-wrapped cigarette)". For example, in a general cigarette, a product obtained by sprinkling the above-described tobacco flavor liquid on the tobacco residue (substrate) obtained by the method described in <1. Method for Producing Tobacco Flavor Liquid> above may be used as the tobacco filler. In this instance, an object sprinkled with the tobacco flavor liquid may be something other than the tobacco residue obtained by the method described in <1. Method for Producing Tobacco Flavor Liquid> above.

5. Advantageous Effects

According to the method for producing a tobacco flavor liquid of the present invention, in the extraction step (S1), a component is extracted from a starting tobacco material using an organic solvent to thereby obtain a tobacco component-containing liquid; and in the subsequent esterification step (S2), the tobacco component-containing liquid is mixed and reacted with an aqueous solution containing a basic substance and an alcohol in an oxygen-containing atmosphere, thereby obtaining a tobacco flavor liquid. Therefore, a tobacco flavor liquid with an increased amount of ester can be obtained by an extremely simple process (see Example 1 described later). By using this tobacco flavor liquid, a smoking article with an enhanced tobacco flavor can be provided.

In the method for producing a tobacco flavor liquid of the present invention, the above reaction is performed, for example, at 0° C. to 90° C. The aqueous solution is a mixed solution of a water solution of a basic substance and an alcohol, and the pH of the water solution of the basic substance is 11.0 to 14.0. According to these configurations, the esterification step can be performed at a low temperature under the presence of the basic substance having a pH of 11.0 to 14.0. In particular, it is conventionally necessary to react a strong acid such as sulfuric acid with a substrate at a high temperature, as described in [0062] of Jpn. PCT National Publication No. 2017-502681, which entails a safety concern. In addition, the important flavor components and other components in the tobacco component-containing liquid may be denatured by the influence of heat and strong acid. It is also necessary to prepare production equipment capable of withstanding a long-term use of heat and strong acid, which increases production cost. According to the method for producing a tobacco flavor liquid of the present invention, the reaction temperature can be made relatively low, in which case a tobacco flavor liquid can be produced extremely easily and safely. Further, it is possible to provide a tobacco flavor liquid that maintains the original flavor of the starting tobacco material and has an aroma enhanced by the ester. There is also no burden on the production equipment.

In the method for producing a tobacco flavor liquid of the present invention, the reaction is performed over a period of, for example, 1 to 60 minutes. According to this configuration, the reaction can be completed in a short period of time, a tobacco flavor liquid can be produced in a short period of time, and the load on the production equipment can be reduced when producing the tobacco flavor liquid.

The above reaction is performed, for example, while shaking. According to this configuration, the reaction can be promoted by mixing a reaction solution with a force applied from the outside.

According to the method for producing an ester compound of the present invention, in the extraction step (S1), a component is extracted from a starting tobacco material using an organic solvent, to thereby obtain a tobacco component-containing liquid; in the subsequent esterification step (S2), the tobacco component-containing liquid is reacted with an aqueous solution containing a basic substance and an alcohol in an oxygen-containing atmosphere to thereby obtain a tobacco flavor liquid; and in the subsequent separation step (S3), an ester compound is separated from the tobacco flavor liquid. Therefore, the ester compound can be obtained extremely easily, safely and efficiently.

6. Preferred Embodiments

Hereinafter, preferred embodiments of the present invention are shown together.

[1]

A method for producing a tobacco flavor liquid, the method including:

- extracting a component from a starting tobacco material using an organic solvent, to thereby obtain a tobacco component-containing liquid; and
- mixing the tobacco component-containing liquid with an aqueous solution containing a basic substance and an alcohol in an oxygen-containing atmosphere to react the tobacco component-containing liquid with the aqueous solution, thereby obtaining a tobacco flavor liquid.

[2]

The method according to [1], wherein the reaction is performed at a temperature of 0° C. to 90° C., preferably 10° C. to 70° C., and more preferably 15° C. to 60° C.

[3]

The method according to any one of [1] and [2], wherein the aqueous solution is a mixed solution of a water solution of the basic substance and the alcohol, and a pH of the water solution of the basic substance is 11.0 to 14.0, preferably 11.3 to 13.0, more preferably 11.8 to 13.0, and still more preferably 12.0 to 13.0.

[4]

The method according to any one of [1] to [3], wherein the basic substance is a hydroxide of an alkali metal or an alkaline earth metal.

[5]

The method according to any one of [1] to [4], wherein the basic substance is strongly basic.

[6]

The method according to any one of [1] to [5], wherein the aqueous solution is a mixed solution of a water solution of the basic substance and the alcohol, and the basic substance is present in the water solution of the basic substance at a concentration of 0.01 N to 5 N, preferably 0.05 N to 0.5 N.

[7]

The method according to any one of [1] to [6], wherein an organic solvent included in the tobacco component-containing liquid is immiscible with the aqueous solution.

[8]

The method according to any one of [1] to [7], wherein a proportion of a volume of the alcohol in a total of a volume of the tobacco component-containing liquid and a volume of the aqueous solution is 2.0% to 28.6%, preferably 10.7% to 28.6%.

[9]

The method according to any one of [1] to [8], wherein the reaction is performed over a period of 1 to 60 minutes, preferably 5 to 60 minutes.

[10]

The method according to any one of [1] to [9], wherein the reaction is performed while shaking.

[11]

A tobacco flavor liquid produced by the method for producing a tobacco flavor liquid according to any one of [1] to [10].

[12]

A method for producing an ester compound, the method including:

- extracting a component from a starting tobacco material using an organic solvent to thereby obtain a tobacco component-containing liquid;
- reacting the tobacco component-containing liquid with an aqueous solution containing a basic substance and an alcohol in an oxygen-containing atmosphere to thereby obtain a tobacco flavor liquid; and
- separating an ester compound from the tobacco flavor liquid.

[13]

A smoking article including the tobacco flavor liquid according to [11].

[14]

The method according to any one of [1] to [10], wherein the starting tobacco material is one, or a mixture of two or more selected from the group consisting of Oriental species, yellow species, burley species, native species, and wild tobacco species, and preferably one, or a mixture of two or more selected from the group consisting of Oriental species and native species.

[15]

The method according to any one of [1] to [10] and [14], wherein the starting tobacco material is a tobacco leaf containing 0.5 mg/g to 1.5 mg/g of 3-methylvaleric acid and 0.05 mg/g to 0.3 mg/g of isovaleric acid.

[16]

The method according to any one of [1] to [12], [14], and [15], wherein the starting tobacco material is either a harvested leaf just harvested on a farm or a harvested leaf after a predetermined lapse of time post-harvest.

[17]

The method according to any one of [1] to [12] and [14] to [16], wherein an organic solvent included in the tobacco component-containing liquid is one, or a mixture of two or more selected from the group consisting of hexane, pentane, diethyl ether, TBME (t-butyl methyl ether), and ethyl acetate.

[18]

The method according to any one of [1] to [12] and [14] to [17], wherein the aqueous solution is a mixed solution of a water solution of the basic substance and the alcohol, and the water solution of the basic substance and the alcohol are preferably mixed at a volume ratio of 10:1 to 1:4, and more preferably mixed at a volume ratio of 5:3 to 1:2.

[19]

The method according to any one of [1] to [12] and [14] to [18], wherein the alcohol is a lower alcohol having a carbon number of 5 or less.

[20]

The method according to any one of [1] to [12] and [14] to [19], wherein the extraction is performed by immersing the starting tobacco material in the organic solvent for a period of 30 seconds to several days, more preferably 1 minute to 12 hours, and most preferably 5 minutes to 3 hours.

EXAMPLES

<Evaluation of Effectiveness of Sodium Hydroxide Treatment>

Example 1

1.5 kg of harvested leaves of Oriental species as a starting tobacco material were immersed in 3.0 L of hexane at 25° C. for 0.5 hours in an air atmosphere (extraction step (S1)). A tobacco component-containing liquid (a first tobacco component-containing liquid) thus obtained was filtered, and the filtrate was concentrated to dryness using a rotary evaporator. 0.02 g of a concentrated dry solid product was placed in a centrifuge tube made of polypropylene, and 20 mL of hexane was added thereto, to obtain a tobacco component-containing liquid (a second tobacco component-containing liquid) in which the concentrated dry solid product was dissolved. Further, 5 mL of 0.5 N water solution of sodium hydroxide and 5 mL of ethanol were added to the same centrifuge tube to form a mixed solution of hexane (organic solvent) and an aqueous solution (water solution of sodium hydroxide and ethanol). The centrifuge tube containing the mixed solution was shaken at 180 rpm at 25° C. for 60 minutes in an air atmosphere (esterification step (S2)).

After shaking, the centrifuge tube was allowed to stand for 5 minutes. As a result, the mixed solution in the centrifuge tube was separated into two phases of an organic solvent phase and an aqueous solution phase. When the concentration of the basic substance is low, it is difficult for the bubbles in the boundary layer to break spontaneously. Thus, in such a case, centrifugation was performed for 1 minute at 3000 rpm using a centrifugal separator in order to break the bubbles in the boundary layer. A liquid removed from the upper organic solvent phase (hexane phase) was analyzed by gas chromatography mass spectrometry (GC-MS). Prior to the esterification step (S2), the pH of the water solution of the basic substance prior to being mixed with the alcohol was measured.

Comparative Example 1

As Comparative Example 1, a sample was prepared under the same conditions as those of Example 1, except that 5 mL of water was added instead of 5 mL of the water solution of sodium hydroxide. In Comparative Example 1 also, the extraction step (S1) and the esterification step (S2) were performed and a liquid removed from the upper organic solvent phase (hexane phase) was analyzed by GC-MS, in the same manner as described in Example 1.

[Results]

Figure 4:
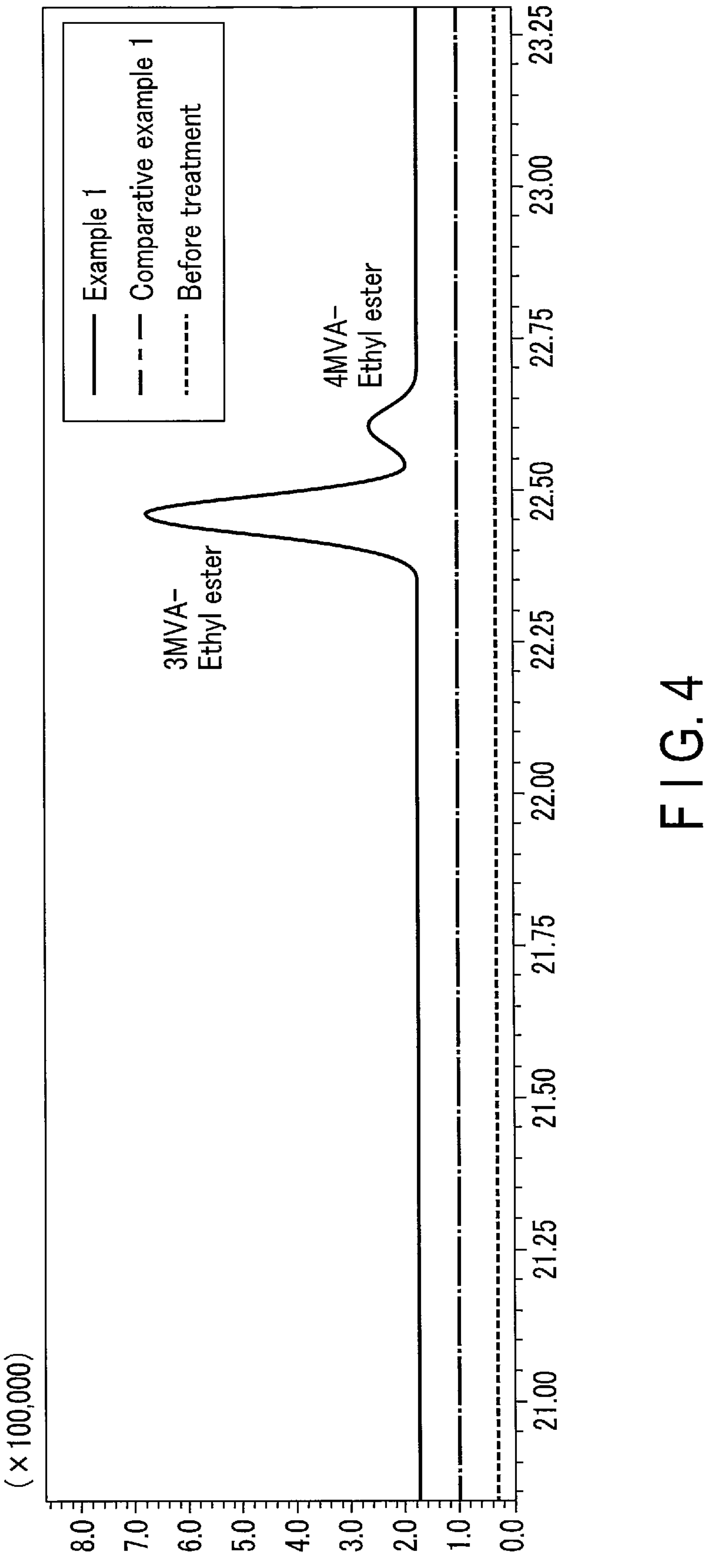
FIG. 4 is a graph showing the results of GC-MS on the effectiveness of sodium hydroxide treatment.
Figure 6:
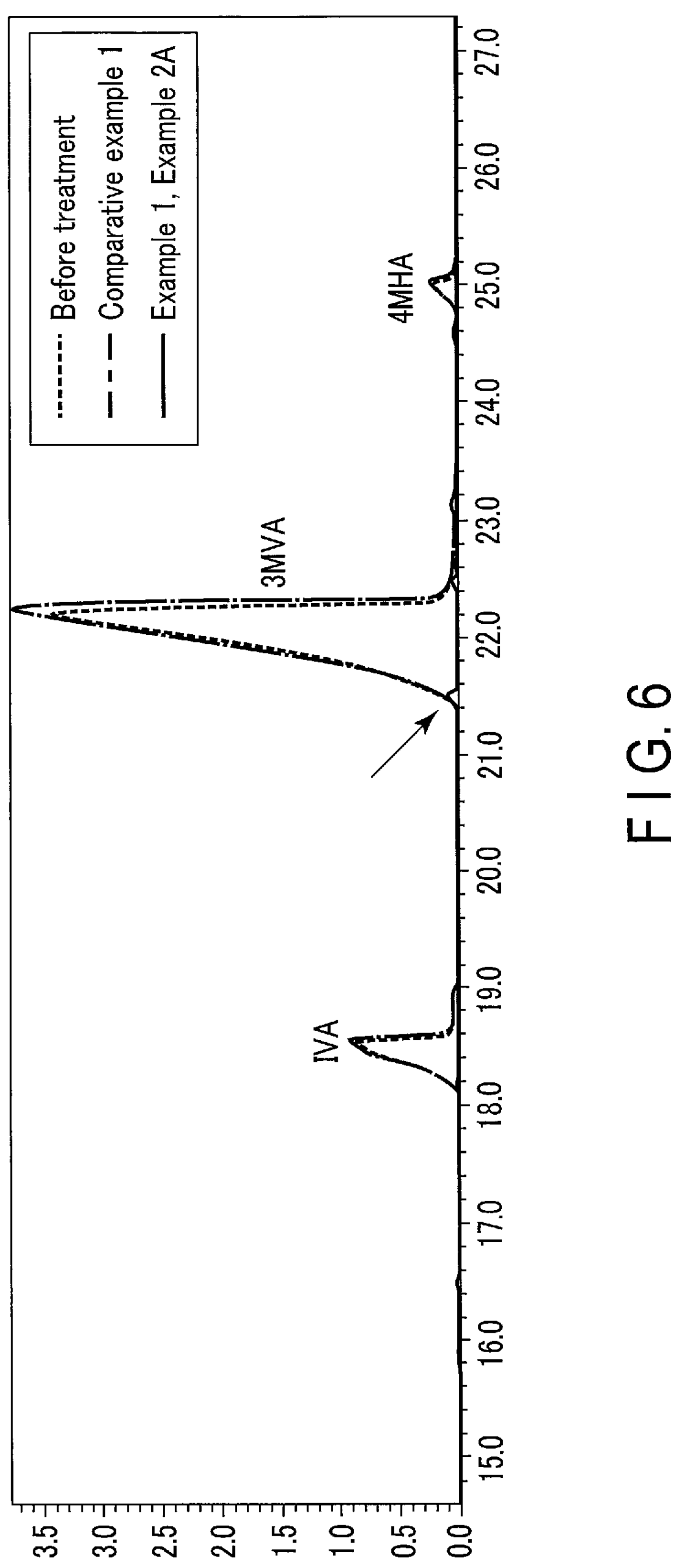
FIG. 6 is a graph showing the results of GC-MS of Examples 1 and 2A, in which the amounts of valeric acids and hexanoic acids originally contained in a starting tobacco material decreased after an esterification step.
Figure 7:
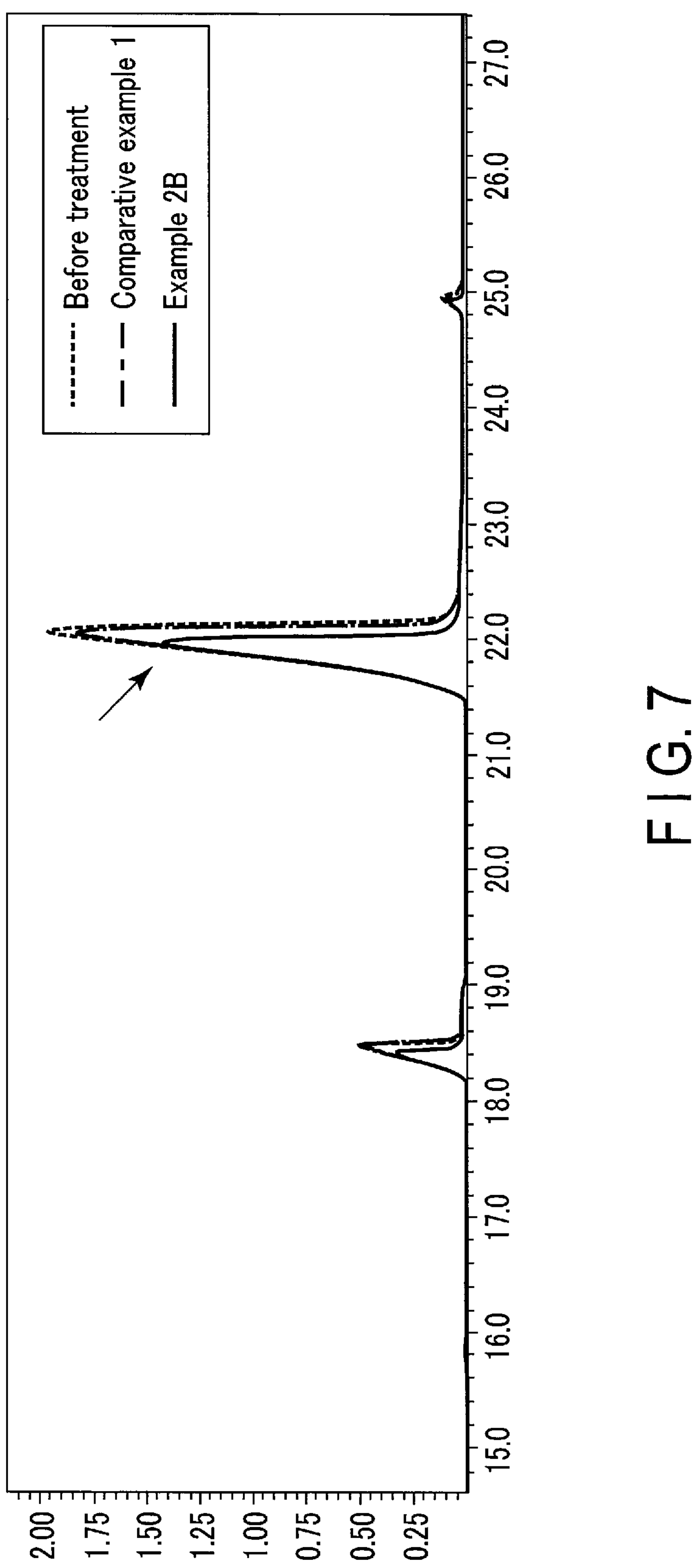
FIG. 7 is a graph showing the result of GC-MS of Example 2B, in which the amounts of valeric acids and hexanoic acids originally contained in a starting tobacco material decreased after an esterification step.
Figure 8:
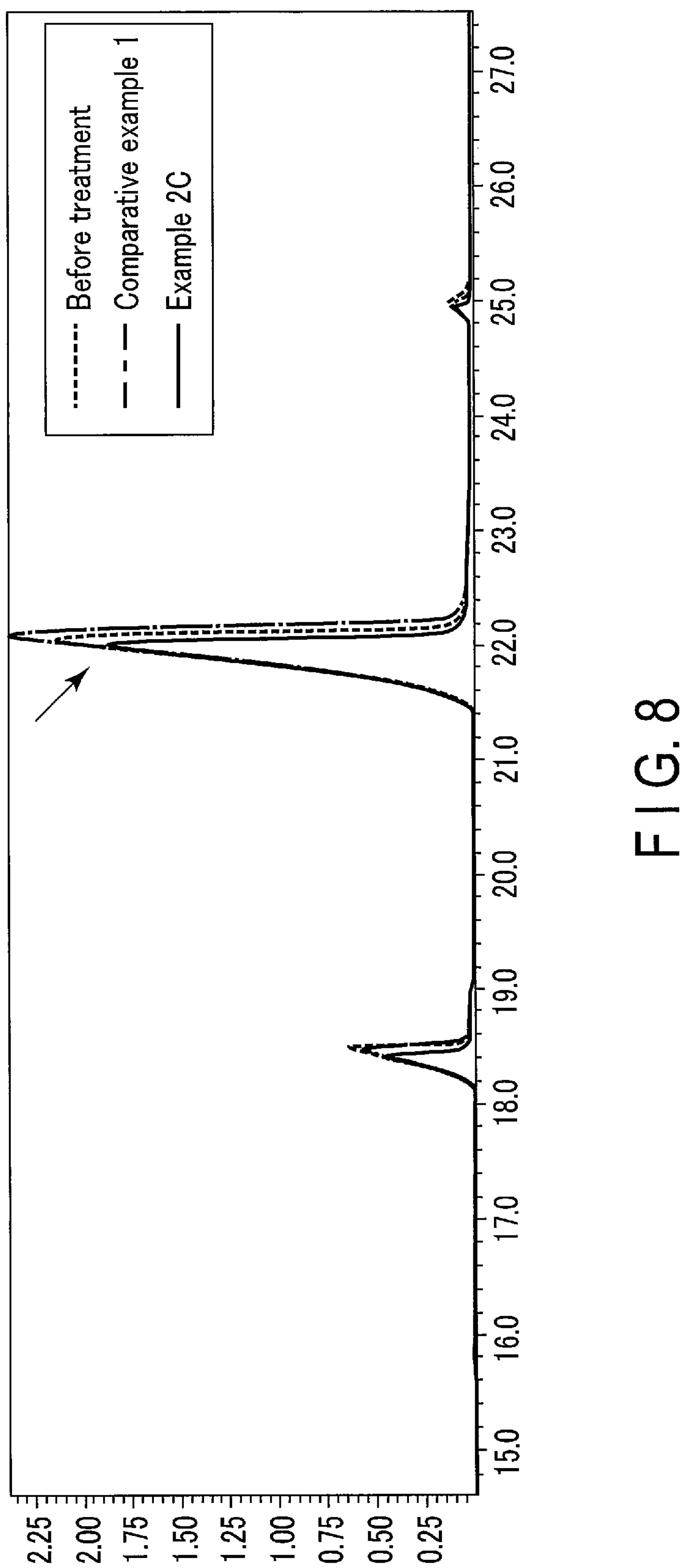
FIG. 8 is a graph showing the result of GC-MS of Example 2C, in which the amounts of valeric acids and hexanoic acids originally contained in a starting tobacco material decreased slightly after an esterification step.
Figure 9:
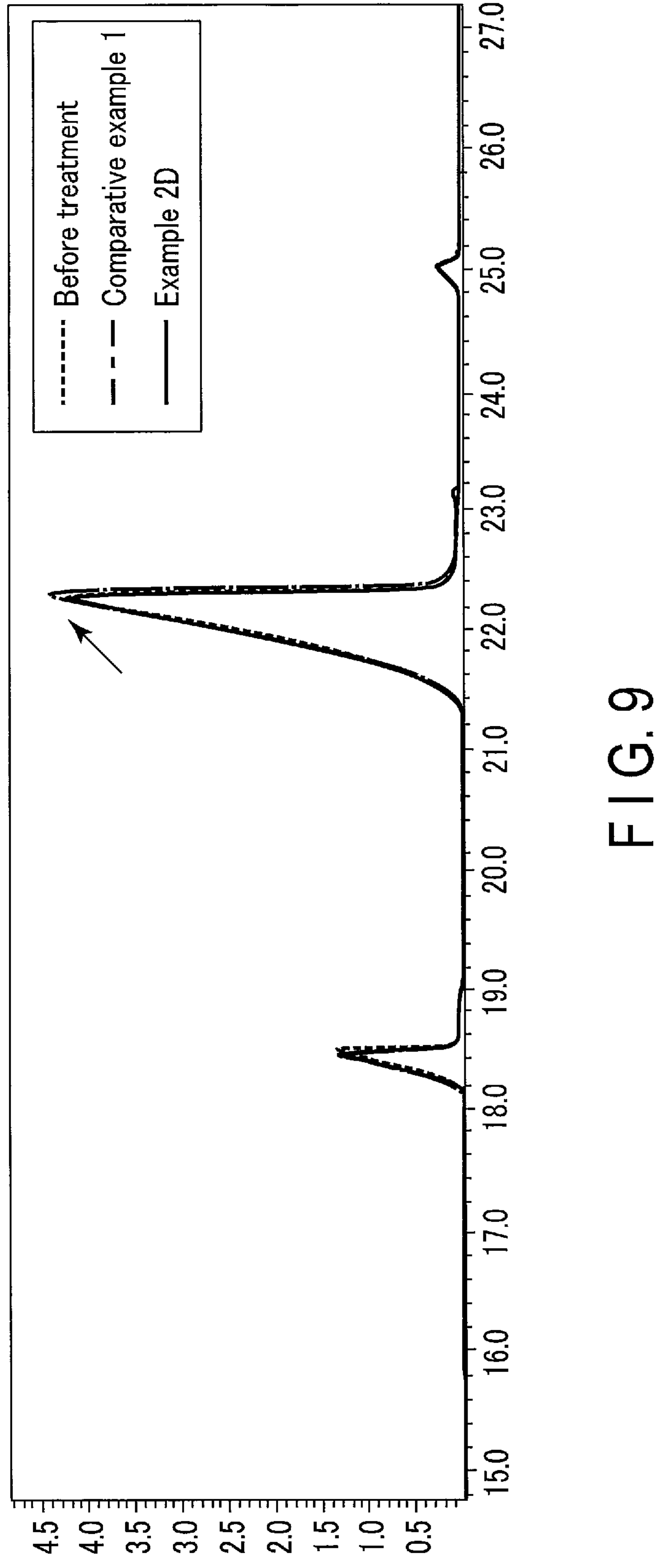
FIG. 9 is a graph showing the result of GC-MS of Example 2D, in which the amounts of valeric acids and hexanoic acids originally contained in a starting tobacco material decreased slightly after an esterification step.
Figure 10:
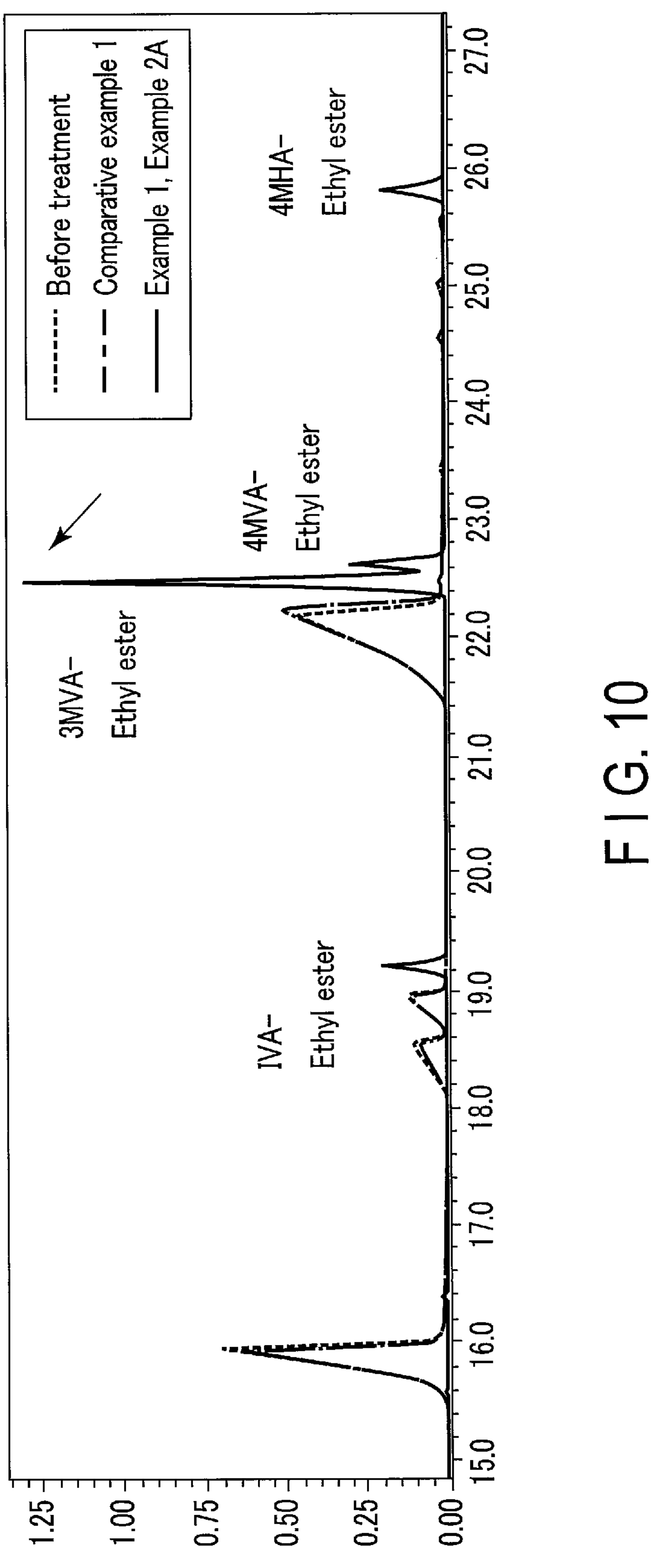
FIG. 10 is a graph showing the results of GC-MS of Examples 1 and 2A, in which various ethyl esters were generated after an esterification step.

The results are shown in FIGS. 4, 6 and 10. In GC-MS, the horizontal axis represents elapsed time, and the vertical axis represents signal intensity. In FIG. 4, the signals of Example 1 and Comparative Example 1 are shifted upward.

In Example 1, various valeric acids and hexanoic acids originally contained in the starting tobacco material disappeared after the treatment, as shown in FIG. 6. As used herein, IVA represents isovaleric acid, 3MVA represents 3-methylvaleric acid, 4MHA represents 4-methylhexanoic acid, and 4MVA represents 4-methylvaleric acid.

In Example 1, various ethyl esters were generated in place of various valeric acids and hexanoic acids, as shown in FIGS. 4 and 10. Various ethyl esters include IVA-ethyl ester, 3MVA-ethyl ester, 4MVA-ethyl ester, 4MHA-ethyl ester, and the like. According to Example 1, a tobacco flavor liquid or ester compounds with increased amounts of various ethyl esters were obtained. In Comparative Example 1, neither were various ethyl esters generated, nor did the amounts of various valeric acids and hexanoic acids decrease, as shown in FIGS. 4 and 10. In Example 1, the pH of the water solution of the basic substance prior to mixing with the alcohol was 13.0.

Figure 5:
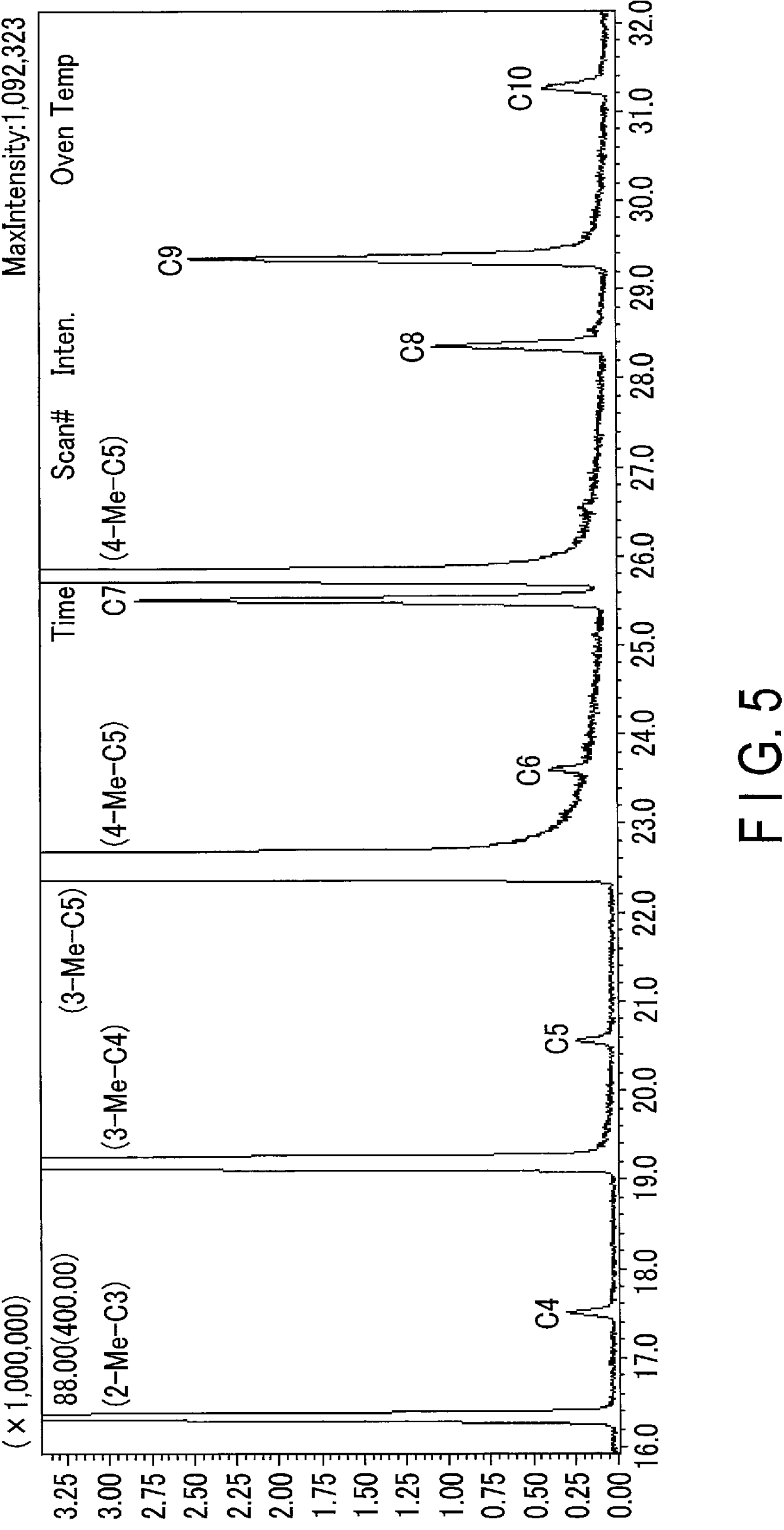
FIG. 5 is a graph showing the result of GC-MS of Example 1, in which various ethyl esters were generated after an esterification step.

Another analysis result (GC-MS) of Example 1 is shown in FIG. 5. In Example 1, various ethyl esters of organic acids having a carbon number of 4 to 10 were generated in addition to the above IVA-ethyl ester, 3MVA-ethyl ester, 4MVA-ethyl ester, and 4MHA-ethyl ester, as shown in FIG. 5. In Example 1, 2-methylpropanoic acid ethyl ester (2-Me-C3), butanoic acid ethyl ester (C4), 3-methylbutanoic acid ethyl ester (3-Me-C4), pentanoic acid ethyl ester (C5), 3-methylpentanoic acid ethyl ester (3-Me-C5), 4-methylpentanoic acid ethyl ester (4-Me-C5), hexanoic acid ethyl ester (C6), heptanoic acid ethyl ester (C7), 4-methylhexanoic acid ethyl ester (4-Me-C6), octanoic acid ethyl ester (C8), nonanoic acid ethyl ester (C9), and decanoic acid ethyl ester (C10) were generated. In Example 1, ester of an organic acid having a carbon number of 11 or more was not confirmed.

[Discussion]

It was found that the presence of a basic substance such as sodium hydroxide in a mixed solution of an organic solvent and an aqueous solution was necessary in the esterification step (S2).

<Evaluation of Effectiveness of Addition of Organic Solvent Other Than Hexane>

Example 2A

In Example 2A, prior to the esterification step (S2), 20 mL of pentane was added as an organic solvent instead of 20 mL of hexane to dissolve 0.02 g of a concentrated dry solid product. The other conditions were the same as those of Example 1. In Example 2A also, the extraction step (S1) and the esterification step (S2) were performed and a liquid removed from the upper organic solvent phase (pentane phase) was analyzed by GC-MS, in the same manner as described in Example 1.

Example 2B

In Example 2B, prior to the esterification step (S2), 20 mL of diethyl ether was added as an organic solvent instead of 20 mL of hexane to dissolve 0.02 g of a concentrated dry solid product. The other conditions were the same as those of Example 1. In Example 2B also, the extraction step (S1) and the esterification step (S2) were performed and a liquid removed from the upper organic solvent phase (diethyl ether phase) was analyzed by GC-MS, in the same manner as described in Example 1.

Example 2C

In Example 2C, 20 mL of TBME (t-butyl methyl ether) was added as an organic solvent instead of 20 mL of hexane to dissolve 0.02 g of a concentrated dry solid product. The other conditions were the same as those of Example 1. In Example 2C also, the extraction step (S1) and the esterification step (S2) were performed and a liquid removed from the upper organic solvent phase (TBME phase) was analyzed by GC-MS, in the same manner as described in Example 1.

Example 2D

In Example 2D, 20 mL of ethyl acetate was added as an organic solvent instead of 20 mL of hexane to dissolve 0.02 g of a concentrated dry solid product. The other conditions were the same as those of Example 1. In Comparative Example 2D also, the extraction step (S1) and the esterification step (S2) were performed and a liquid removed from the upper organic solvent phase (ethyl acetate phase) was analyzed by GC-MS, in the same manner as described in Example 1.

[Results]

The results are shown in FIGS. 6 to 13.

In Example 2A (dissolved with pentane), the valeric acids and hexanoic acids originally contained in the starting tobacco material disappeared after the esterification step (see FIG. 6), and various ethyl esters were generated instead (see FIG. 10). Thus, the results of Example 2A were approximately the same as those of Example 1. In Example 2A, a tobacco flavor liquid or ester compounds with increased amounts of various ethyl esters were obtained. FIGS. 6 and 10 show the results of using hexane as an organic solvent to dissolve the concentrated dry solid product. In FIGS. 6 and 10, only the results of Example 1 are shown as a representative, for approximately the same results were obtained when pentane was used as in Example 2A.

Figure 11:
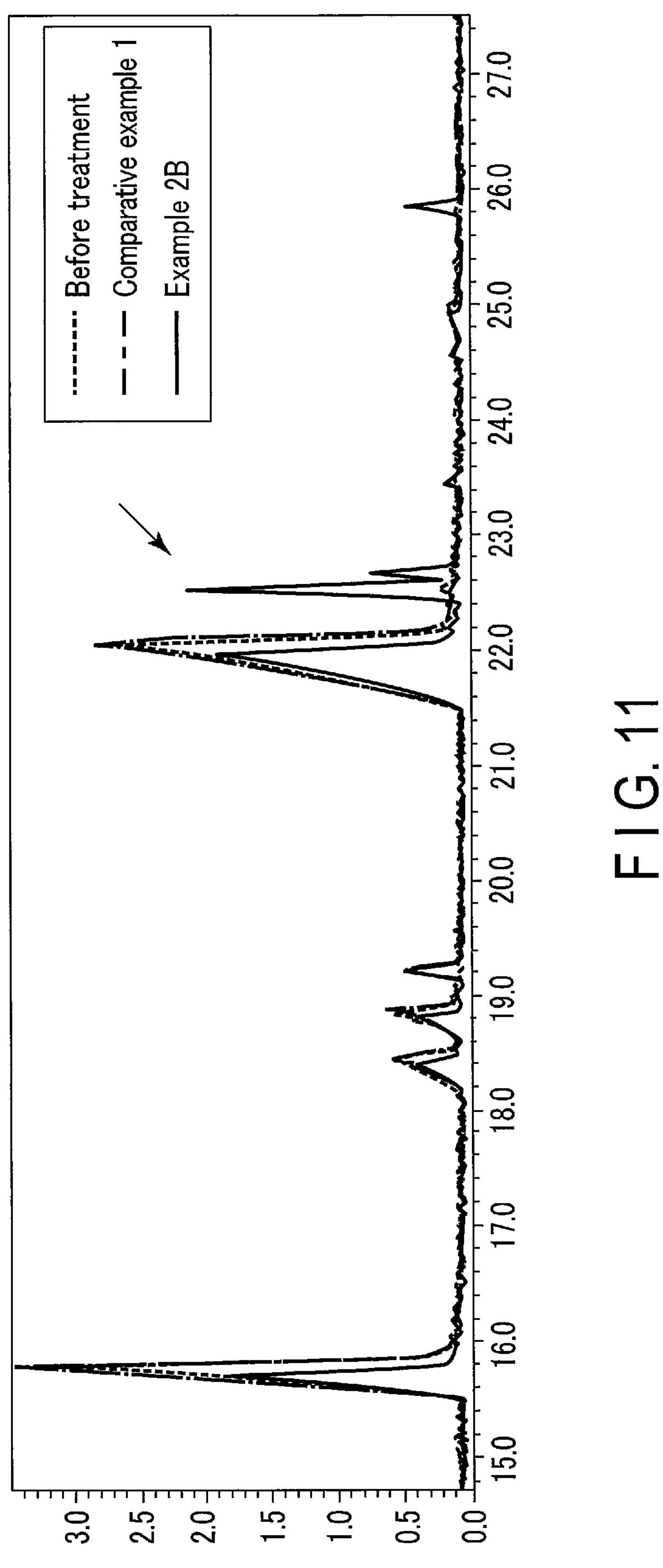
FIG. 11 is a graph showing the result of GC-MS of Example 2B, in which various ethyl esters were generated after an esterification step.

In Example 2B (dissolved with diethyl ether), the amounts of the valeric acids and hexanoic acids originally contained in the starting tobacco material slightly decreased after the esterification step (see FIG. 7), and various ethyl esters were generated instead (see FIG. 11). That is, according to Example 2B, a tobacco flavor liquid or ester compounds with increased amounts of various ethyl esters were obtained. However, the mass of the various ethyl esters generated in Example 2B was about 28% of the mass of the various ethyl esters generated in Example 1.

Figure 12:
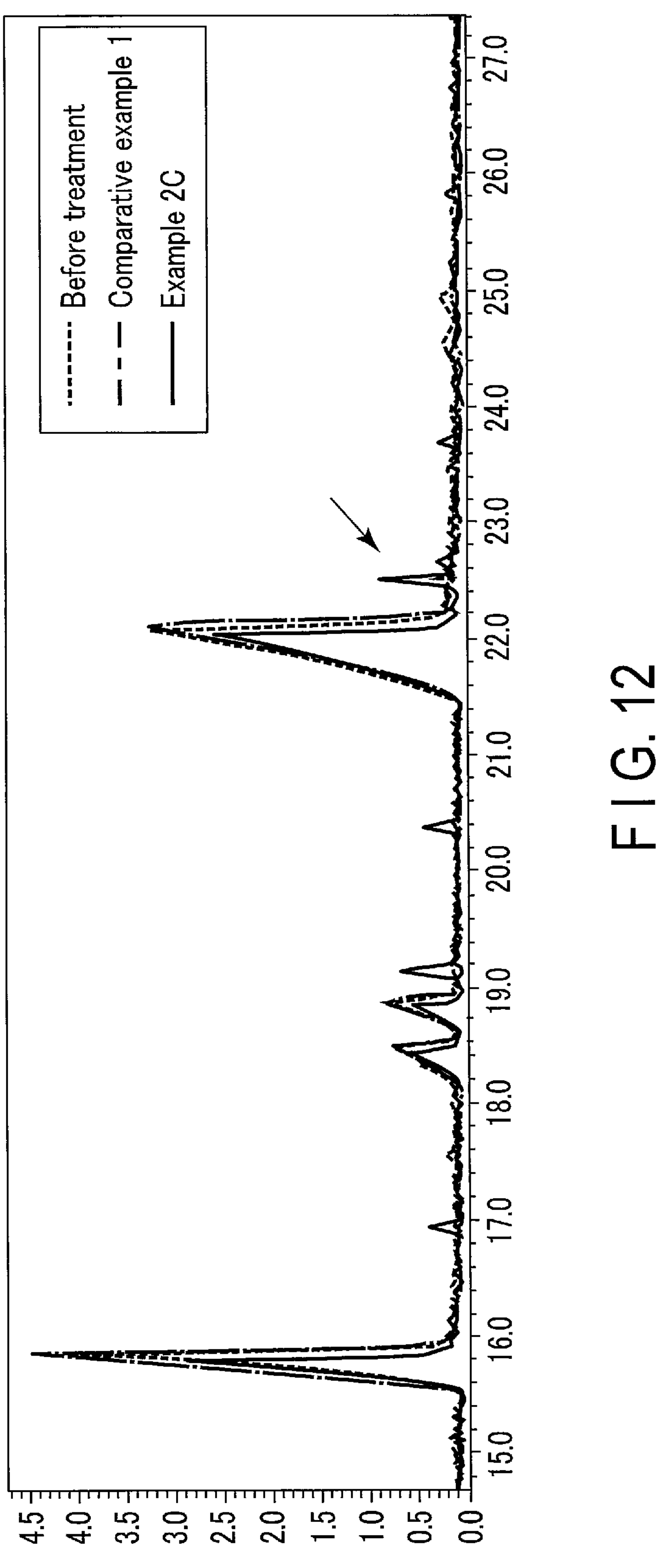
FIG. 12 is a graph showing the result of GC-MS of Example 2C, in which various ethyl esters were generated in slight amounts after an esterification step.

In Example 2C (dissolved with TBME), the amounts of the valeric acids and hexanoic acids originally contained in the starting tobacco material slightly decreased after the esterification step (see FIG. 8), and various ethyl esters were generated instead (see FIG. 12). That is, according to Example 2C, a tobacco flavor liquid or ester compounds with increased amounts of various ethyl esters were obtained. However, the mass of the various ethyl esters generated in Example 2C was about 10% of the mass of the various ethyl esters generated in Example 1.

Figure 13:
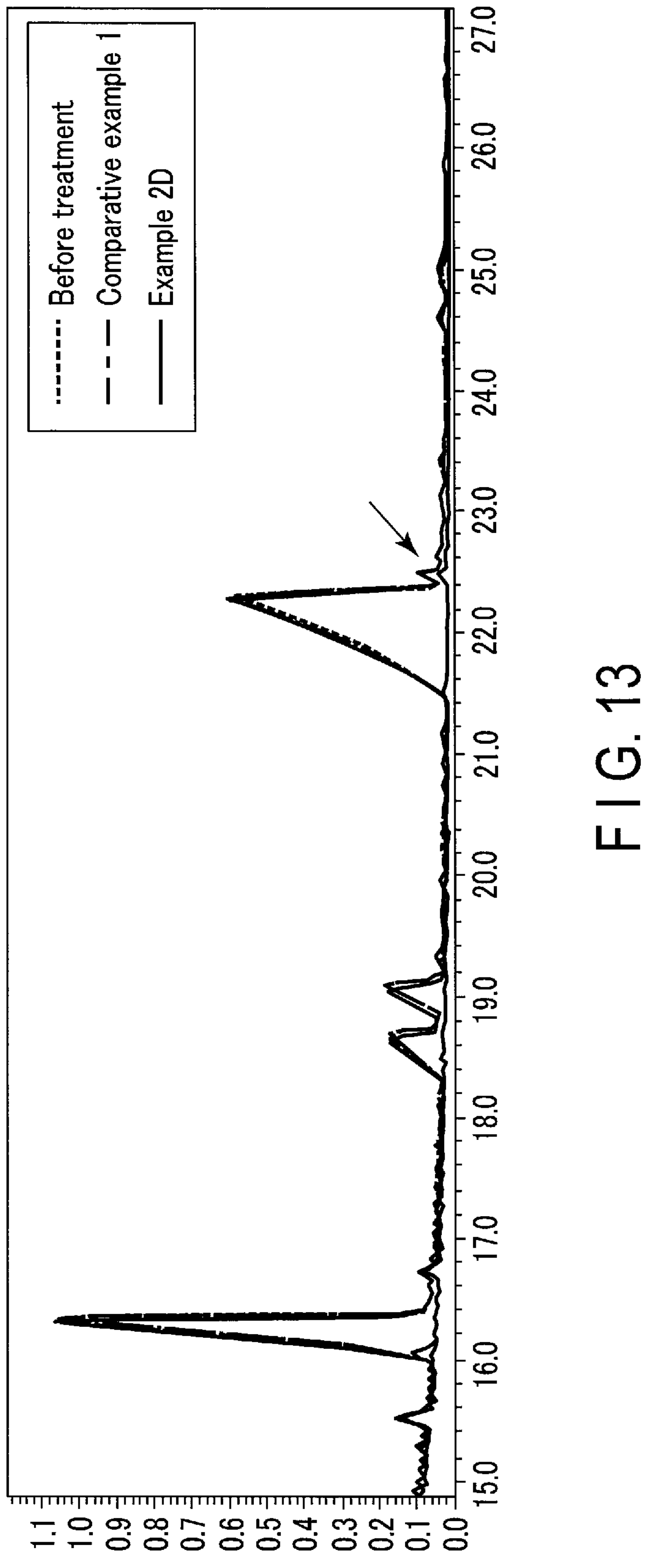
FIG. 13 is a graph showing the result of GC-MS of Example 2D, in which various ethyl esters were generated in slight amounts after an esterification step.

In Example 2D (dissolved with ethyl acetate), the amounts of the valeric acids and hexanoic acids originally contained in the starting tobacco material slightly decreased after the esterification step (see FIG. 9), and various ethyl esters were generated instead (see FIG. 13). That is, according to Example 2D, a tobacco flavor liquid or ester compounds with increased amounts of various ethyl esters were obtained. However, the mass of the various ethyl esters generated in Example 2D was small and about 7% of the mass of the various ethyl esters generated in Example 1.

[Discussion]

From the results of Example 1, Examples 2A to 2D, and Comparative Example 1, it was found that an organic solvent added to dissolve a concentrated dry solid product prior to the esterification step (S2) was preferably immiscible with the aqueous solution, particularly as shown in Example 1 and Examples 2A to 2C. On the other hand, it was found that when 5 mL of water was added instead of 5 mL of a water solution of sodium hydroxide, as in Comparative Example 1, the amounts of valeric acids and the like did not decrease, and ethyl esters were not generated.

<Evaluation of Temperature in Esterification Step>

Example 3A

In Example 3A, the reaction temperature in the esterification step (S2) was 15° C. The other conditions were the same as those of Example 1. In Example 3A also, the extraction step (S1) and the esterification step (S2) were performed and a liquid removed from the upper organic solvent phase (hexane phase) was analyzed by GC-MS, in the same manner as described in Example 1.

Example 3B

In Example 3B, the reaction temperature in the esterification step (S2) was 40° C. The other conditions were the same as those of Example 1. In Example 3B also, the extraction step (S1) and the esterification step (S2) were performed and a liquid removed from the upper organic solvent phase (hexane phase) was analyzed by GC-MS, in the same manner as described in Example 1.

Example 3C

In Example 3C, the reaction temperature in the esterification step (S2) was 60° C. The other conditions were the same as those of Example 1. In Example 3C also, the extraction step (S1) and the esterification step (S2) were performed and a liquid removed from the upper organic solvent phase (hexane phase) was analyzed by GC-MS, in the same manner as described in Example 1.

Comparative Example 2

In Comparative Example 2, prior to the esterification step (S2), 5 mL of water was added to a centrifuge tube in place of 5 mL of a water solution of sodium hydroxide. The reaction temperature in the esterification step (S2) was 15° C. The other conditions were the same as those of Example 1. In Comparative Example 2 also, the extraction step (S1) and the esterification step (S2) were performed and a liquid removed from the upper organic solvent phase (hexane phase) was analyzed by GC-MS, in the same manner as described in Example 1.

Comparative Example 3

In Comparative Example 3, prior to the esterification step (S2), 5 mL of water was added to a centrifuge tube in place of 5 mL of a water solution of sodium hydroxide. The reaction temperature in the esterification step (S2) was 40° C. The other conditions were the same as those of Example 1. In Comparative Example 3 also, the extraction step (S1) and the esterification step (S2) were performed and a liquid removed from the upper organic solvent phase (hexane phase) was analyzed by GC-MS, in the same manner as described in Example 1.

Comparative Example 4

In Comparative Example 4, prior to the esterification step (S2), 5 mL of water was added to a centrifuge tube in place of 5 mL of a water solution of sodium hydroxide. The reaction temperature in the esterification step (S2) was 60° C. The other conditions were the same as those of Example 1. In Comparative Example 4 also, the extraction step (S1) and the esterification step (S2) were performed and a liquid removed from the upper organic solvent phase (hexane phase) was analyzed by GC-MS, in the same manner as described in Example 1.

[Results]

Figure 14:
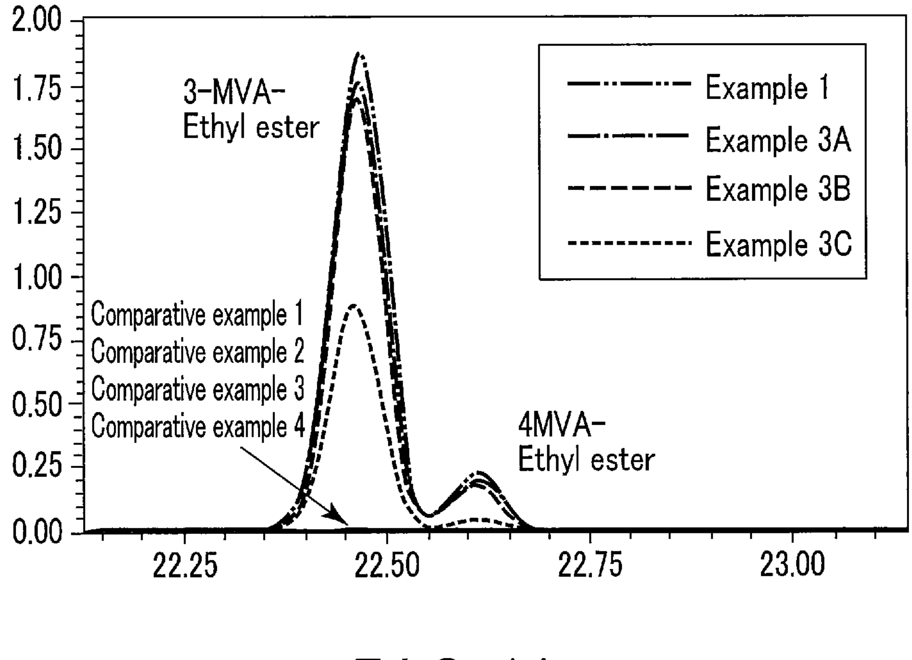
FIG. 14 is a graph showing the results of GC-MS of Example 1 and Examples 3A to 3C, in which various ethyl esters were generated after an esterification step, and of Comparative Examples 1 to 4, in which various ethyl esters were not generated after an esterification step.

The results are shown in FIG. 14.

In Examples 3A and 3B (reaction temperatures in the esterification step: 15° C. and 40° C., respectively), the valeric acids and hexanoic acids originally contained in the starting tobacco material disappeared after the esterification step, and various ethyl esters were generated instead (see FIG. 14). Thus, the results of Examples 3A and 3B were approximately the same as those of Example 1. In Examples 3A and 3B, a tobacco flavor liquid or ester compounds with increased amounts of various ethyl esters were obtained.

In Example 3C (reaction temperature in the esterification step: 60° C.), the valeric acids and hexanoic acids originally contained in the starting tobacco material disappeared after the esterification step, and various ethyl esters were generated instead (see FIG. 14). Thus, in Example 3C, a tobacco flavor liquid or ester compounds with increased amounts of various ethyl esters were obtained. However, the mass of the various ethyl esters generated in Example 3C was about 50% of the mass of the various ethyl esters generated in Example 1.

In Comparative Example 2 (no water solution of sodium hydroxide added, reaction temperature in the esterification step: 15° C.), the amounts of the valeric acids and hexanoic acids originally contained in the starting tobacco material did not decrease after the esterification step. Also, various ethyl esters were not generated after the esterification step (see FIG. 14).

In Comparative Example 3 (no water solution of sodium hydroxide added, reaction temperature in the esterification step: 40° C.), the amounts of the valeric acids and hexanoic acids originally contained in the starting tobacco material did not decrease after the esterification step. Also, various ethyl esters were not generated after the esterification step (see FIG. 14).

In Comparative Example 4 (no water solution of sodium hydroxide added, reaction temperature in the esterification step: 60° C.), the amounts of the valeric acids and hexanoic acids originally contained in the starting tobacco material did not decrease after the esterification step. Also, various ethyl esters were not generated after the esterification step (see FIG. 14).

[Discussion]

From the results of Examples 1 and 3A to 3C, it was found that an increase in the reaction temperature led to decreased efficiency of the esterification reaction, as shown in Example 3C. It was found that the reaction temperature in the esterification step (S2) was thus preferably 15° C. to 60° C., and more preferably 15° C. to 40° C. From the results of Comparative Examples 1 and 2 to 4, it was found that the presence of a basic substance was essential in the esterification step (S2), and that its absence prevented the esterification reaction from proceeding even when the temperature was varied. The foregoing suggests that in the esterification reaction occurring in the esterification step (S2), some kind of catalytic component derived from the starting tobacco material may have been present in the reaction solution. The catalytic component has been unidentified. The esterification reaction may have been promoted by this catalytic component. It is suggested that when the reaction temperature in the esterification step (S2) exceeds 60° C., the temperature deviates from an optimum working temperature of the catalytic component.

The catalytic component is assumed to be some kind of enzyme as one of multiple candidates. When the catalytic component is assumed to be an enzyme, the activity may be significantly decreased when the reaction temperature in the esterification step (S2) exceeds 60° C.

<Evaluation of Concentration of Basic Substance>

Example 4A

In Example 4A, prior to the esterification step (S2), 5 mL of 0.25 N water solution of sodium hydroxide was added to a centrifuge tube in place of 5 mL of 0.5 N water solution of sodium hydroxide to form a mixed solution. The other conditions were the same as those of Example 1. In Example 4A also, the extraction step (S1) and the esterification step (S2) were performed and a liquid removed from the upper organic solvent phase (hexane phase) was analyzed by GC-MS, in the same manner as described in Example 1. Prior to the esterification step (S2), the pH of the water solution of the basic substance (water solution of sodium hydroxide) prior to mixing with the alcohol was measured.

Example 4B

In Example 4B, prior to the esterification step (S2), 5 mL of 0.1 N water solution of sodium hydroxide was added to a centrifuge tube in place of 5 mL of 0.5 N water solution of sodium hydroxide to form a mixed solution. The other conditions were the same as those of Example 1. In Example 4B also, the extraction step (S1) and the esterification step (S2) were performed and a liquid removed from the upper organic solvent phase (hexane phase) was analyzed by GC-MS, in the same manner as described in Example 1. Prior to the esterification step (S2), the pH of the water solution of the basic substance (water solution of sodium hydroxide) prior to mixing with the alcohol was measured.

Example 4C

In Example 4C, prior to the esterification step (S2), 5 mL of 0.05 N water solution of sodium hydroxide was added to a centrifuge tube in place of 5 mL of 0.5 N water solution of sodium hydroxide to form a mixed solution. The other conditions were the same as those of Example 1. In Example 4C also, the extraction step (S1) and the esterification step (S2) were performed and a liquid removed from the upper organic solvent phase (hexane phase) was analyzed by GC-MS, in the same manner as described in Example 1. Prior to the esterification step (S2), the pH of the water solution of the basic substance (water solution of sodium hydroxide) prior to mixing with the alcohol was measured.

Example 4D

In Example 4D, prior to the esterification step (S2), 5 mL of 0.01 N water solution of sodium hydroxide was added to a centrifuge tube instead of 5 mL of 0.5 N water solution of sodium hydroxide to form a mixed solution. The other conditions were the same as those of Example 1. In Example 4D also, the extraction step (S1) and the esterification step (S2) were performed and a liquid removed from the upper organic solvent phase (hexane phase) was analyzed by GC-MS, in the same manner as described in Example 1.

Figure 15:
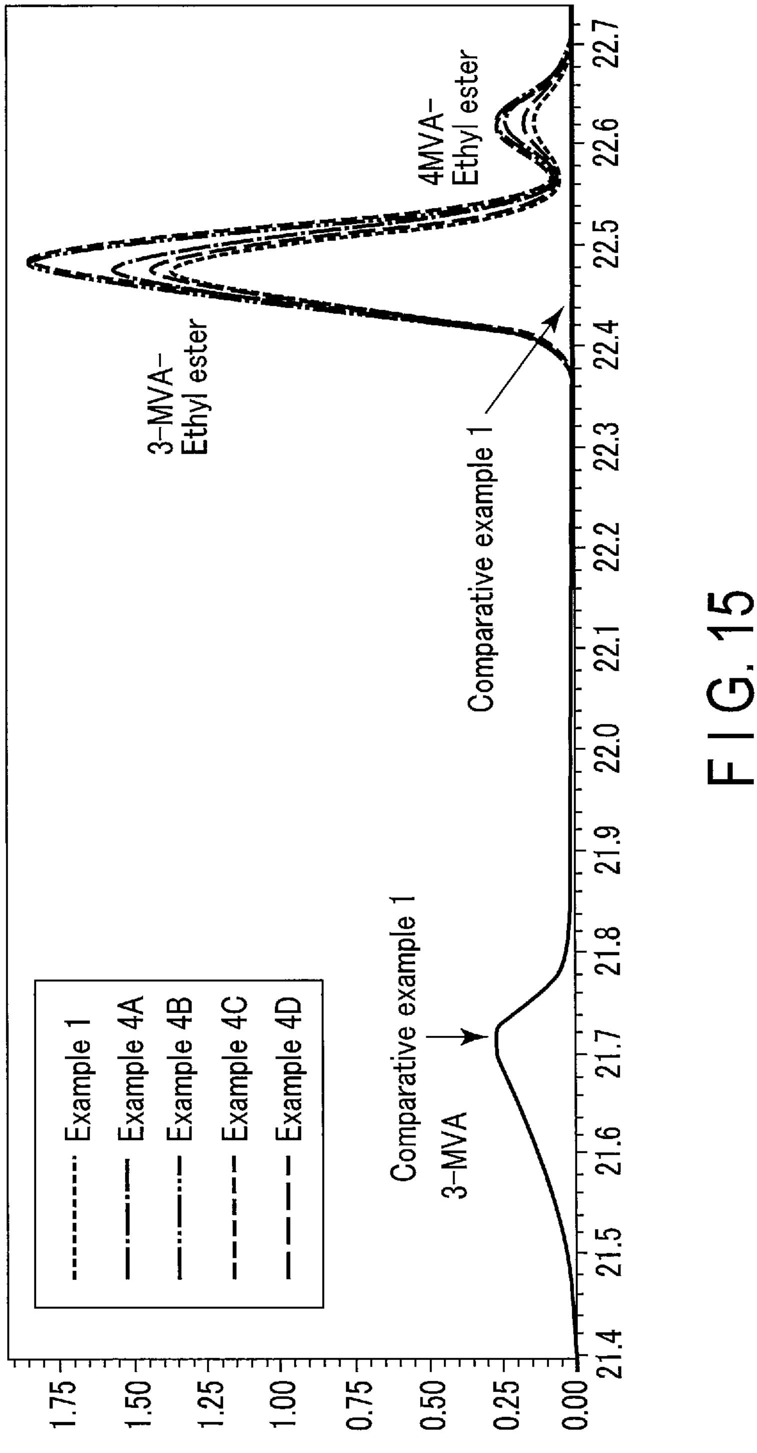
FIG. 15 is a graph showing the results of GC-MS of Example 1 and Examples 4A to 4D, in which valeric acids and hexanoic acids originally contained in a starting tobacco material disappeared after an esterification step and various ethyl esters were generated instead.

The results are shown in FIG. 15.

In all of Examples 4A to 4C, the valeric acids and hexanoic acids originally contained in the starting tobacco material disappeared after the esterification step, and various ethyl esters were generated instead. Thus, in Examples 4A to 4D, a tobacco flavor liquid or ester compounds with increased amounts of various ethyl esters were obtained. In all of Examples 4A to 4D, the amounts of various ethyl esters generated in the esterification step were equivalent to the amounts of various ethyl esters generated in Example 1. Thus, the results of Examples 4A to 4D were approximately the same as those of Example 1.

[Discussion]

From the results of Examples 1 and 4A to 4D, it was found that it sufficed as long as the concentration of the water solution of the strongly basic substance (sodium hydroxide) used in the esterification step (S2) was 0.01 N or more.

<Evaluation of pH of Water Solution of Basic Substance>

The relationship between the pH of the water solution of the basic substance and the generation efficiency of various esters was examined in more detail using the following Examples 4E to 4K.

Example 4E

In Example 4E, prior to the esterification step (S2), 5 mL of a water solution of sodium hydroxide having a pH of 12.6 was added to a centrifuge tube instead of 5 mL of 0.5 N water solution of sodium hydroxide to form a mixed solution. The other conditions were the same as those of Example 1. In Example 4E also, the extraction step (S1) and the esterification step (S2) were performed and a liquid removed from the upper organic solvent phase (hexane phase) was analyzed by GC-MS, in the same manner as described in Example 1.

Example 4F

In Example 4F, prior to the esterification step (S2), 5 mL of a water solution of sodium hydroxide having a pH of 13.0 was added to a centrifuge tube instead of 5 mL of 0.5 N water solution of sodium hydroxide to form a mixed solution. The other conditions were the same as those of Example 1. In Example 4F also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4F when the peak height of 3MVA-ethyl ester obtained by the GC-MS analysis of Example 4E was set to 100 was calculated.

Example 4G

In Example 4G, prior to the esterification step (S2), 5 mL of a water solution of sodium hydroxide having a pH of 12.2 was added to a centrifuge tube instead of 5 mL of 0.5 N water solution of sodium hydroxide to form a mixed solution. The other conditions were the same as those of Example 1. In Example 4G also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4G when the peak height of 3MVA-ethyl ester obtained by the GC-MS analysis of Example 4E was set to 100 was calculated.

Example 4H

In Example 4H, prior to the esterification step (S2), 5 mL of a water solution of sodium hydroxide having a pH of 11.8 was added to a centrifuge tube instead of 5 mL of 0.5 N water solution of sodium hydroxide to form a mixed solution. The other conditions were the same as those of Example 1. In Example 4H also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4H when the peak height of 3MVA-ethyl ester obtained by the GC-MS analysis of Example 4E was set to 100 (esterification rate) was calculated.

Example 4I

In Example 4I, prior to the esterification step (S2), 5 mL of a water solution of sodium hydroxide having a pH of 11.3 was added to a centrifuge tube instead of 5 mL of 0.5 N water solution of sodium hydroxide to form a mixed solution. The other conditions were the same as those of Example 1. In Example 4I also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4I when the peak height of 3MVA-ethyl ester obtained by the GC-MS analysis of Example 4E was set to 100 (esterification rate) was calculated.

Example 4J

In Example 4J, prior to the esterification step (S2), 5 mL of a water solution of sodium hydroxide having a pH of 11.1 was added to a centrifuge tube instead of 5 mL of 0.5 N water solution of sodium hydroxide to form a mixed solution. The other conditions were the same as those of Example 1. In Example 4J also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4J when the peak height of 3MVA-ethyl ester obtained by the GC-MS analysis of Example 4E was set to 100 (esterification rate) was calculated.

Example 4K

In Example 4K, prior to the esterification step (S2), 5 mL of a water solution of sodium hydroxide having a pH of 10.7 was added to a centrifuge tube instead of 5 mL of 0.5 N water solution of sodium hydroxide to form a mixed solution. The other conditions were the same as those of Example 1. In Example 4K also, the extraction step (S1) and the esterification step (S2) were performed and a liquid removed from the upper organic solvent phase (hexane phase) was analyzed by GC-MS, in the same manner as described in Example 1. Further, a numerical value of the peak height of 3MVA-ethyl ester obtained by the GC-MS analysis of Example 4K when the peak height of 3MVA-ethyl ester obtained by the GC-MS analysis of Example 4E was set to 100 (esterification rate) was calculated.

[Results]

The results are shown in the table below and in FIG. 16.

TABLE 1

| | pH | Esterification Rate |
|---|---|---|
| Example 4E | 12.6 | 100.0 |
| Example 4F | 13.0 | 87.56219 |
| Example 4G | 12.2 | 97.01493 |
| Example 4H | 11.8 | 59.70149 |
| Example 4I | 11.3 | 7.462687 |
| Example 4J | 11.1 | 4.975124 |
| Example 4K | 10.7 | 1.99005 |

In all of Examples 4E to 4K, the valeric acids and hexanoic acids originally contained in the starting tobacco material disappeared after the esterification step, and various ethyl esters were generated instead. Thus, in Examples 4E to 4K, a tobacco flavor liquid or ester compounds with increased amounts of various ethyl esters were obtained. The esterification rate of Example 4F was 87.56, the esterification rate of Example 4G was 97.01, the esterification rate of Example 4H was 59.70, the esterification rate of Example 4I was 7.46, the esterification rate of Example 4J was 4.97, and the esterification rate of Example 4K was 1.99.

[Discussion]

From the results of Examples 4E to 4K, it was found that the generation amount of 3MVA-ethyl ester rapidly increased when the water solution of the basic substance (sodium hydroxide) used in the esterification step (S2) had a pH of 11.3 or more. Thus, it was found that a sufficient amount of 3MVA-ethyl ester was generated when the water solution of the basic substance (sodium hydroxide) used in the esterification step (S2) had a pH of 11.3 to 13.0. It was also found that the esterification rate was about 60 or more and a sufficient amount of 3MVA-ethyl ester was generated when the water solution of the basic substance (sodium hydroxide) used in the esterification step (S2) had a pH of 11.8 to 13.0.

<Evaluation of Basic Substances Other than Sodium Hydroxide>

Example 5A

In Example 5A, prior to the esterification step (S2), 5 mL of 0.5 N water solution of potassium hydroxide was added to a centrifuge tube in place of 5 mL of 0.5 N water solution of sodium hydroxide to form a mixed solution. The other conditions were the same as those of Example 1. In Example 5A also, the extraction step (S1) and the esterification step (S2) were performed and a liquid removed from the upper organic solvent phase (hexane phase) was analyzed by GC-MS, in the same manner as described in Example 1. Prior to the esterification step (S2), the pH of the water solution of the basic substance (0.5 N water solution of potassium hydroxide) prior to mixing with the alcohol was measured.

Example 5B

In Example 5B, prior to the esterification step (S2), 5 mL of 0.5 N water solution of calcium hydroxide was added to a centrifuge tube in place of 5 mL of 0.5 N water solution of sodium hydroxide to form a mixed solution. The other conditions were the same as those of Example 1. In Example 5B also, the extraction step (S1) and the esterification step (S2) were performed and a liquid removed from the upper organic solvent phase (hexane phase) was analyzed by GC-MS, in the same manner as described in Example 1. Prior to the esterification step (S2), the pH of the water solution of the basic substance (0.5 N water solution of calcium hydroxide) prior to mixing with the alcohol was measured.

[Results]

Figure 17:
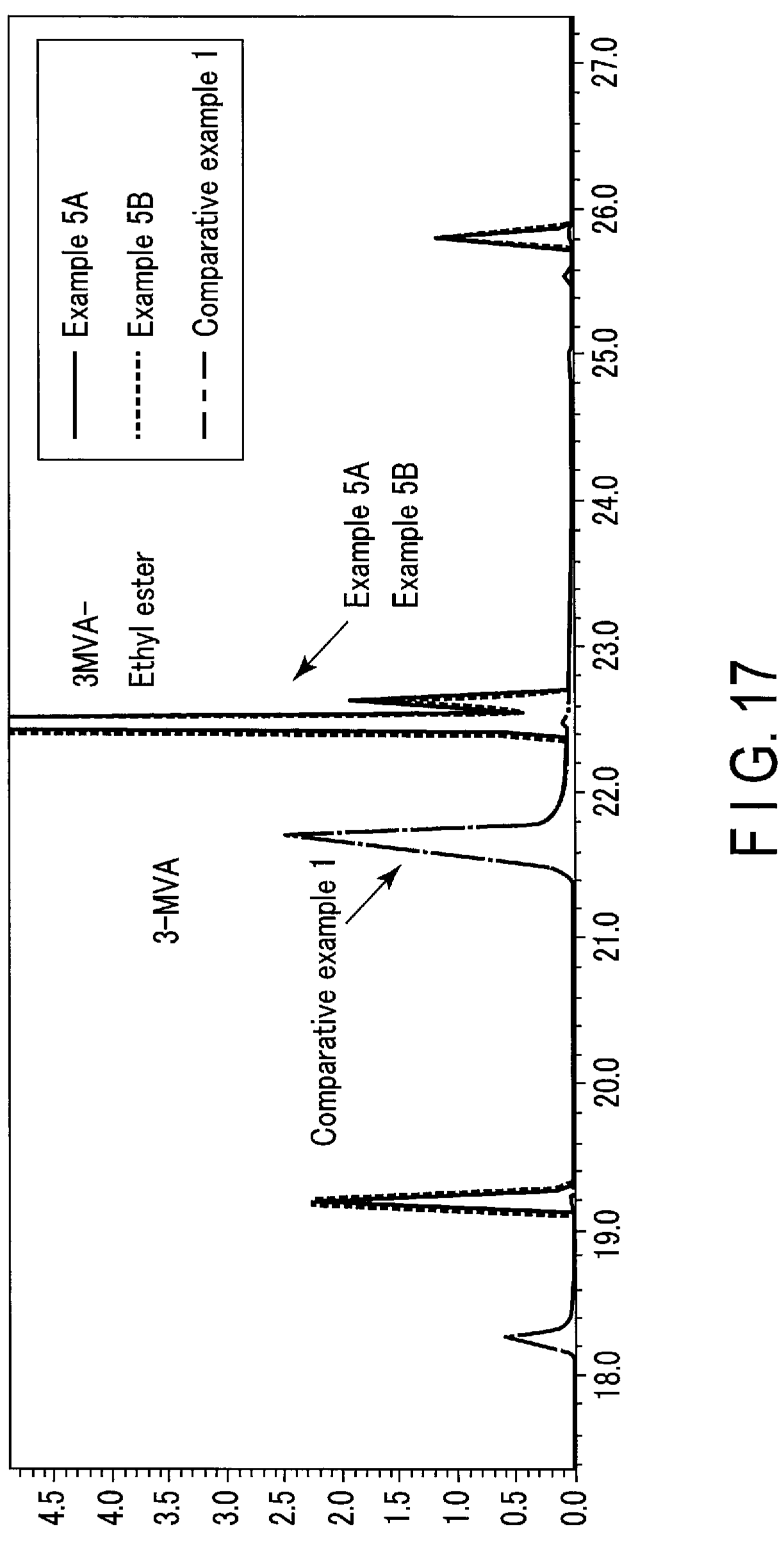
FIG. 17 is a graph showing the results of GC-MS of Examples 5A and 5B, in which valeric acids and hexanoic acids originally contained in a starting tobacco material disappeared after an esterification step and various ethyl esters were generated instead.

The results are shown in FIG. 17.

In Example 5A (0.5 N water solution of potassium hydroxide added) and Example 5B (0.5 N water solution of calcium hydroxide added), the valeric acids and hexanoic acids originally contained in the starting tobacco material disappeared after the esterification step, and various ethyl esters were generated instead (see FIG. 17). The results of Examples 5A and 5B were approximately the same as those of Example 1. Thus, in Examples 5A and 5B, a tobacco flavor liquid or ester compounds with increased amounts of various ethyl esters were obtained.

The pH of the aqueous solution of Example 5A was 13.3. The pH of the aqueous solution of Example 5B was 12.3.

[Discussion]

From the results of Examples 1, 5A, 5B, and 5C, it was found that in the esterification step (S2), strongly basic substances having a degree of ionization close to 1, such as sodium hydroxide, potassium hydroxide, and calcium hydroxide, were effective in the aqueous solution.

Also, from the results of Examples 1, 5A, and 5B, it was found that in the esterification step (S2), the pH of the aqueous solutions was 12.3 to 13.3, and that a pH of strongly basic type was effective. Therefore, in consideration of the results of Examples 1, 5A, and 5B and the results of Examples 1, and 4A to 4K, it is determined that in the esterification step (S2), the pH of the water solution of the basic substance is preferably 11.3 to 13.3, and that a pH of strongly basic type is effective.

<Evaluation of Effectiveness of Addition of Alcohol Other Than Ethanol>

Example 6A

In Example 6A, prior to the esterification step (S2), 5 mL of methanol was added as the alcohol in place of 5 mL of ethanol, and the other conditions were the same as those of Example 1. In Example 6A also, the extraction step (S1) and the esterification step (S2) were performed and a liquid removed from the upper organic solvent phase (hexane phase) was analyzed by GC-MS, in the same manner as described in Example 1.

Example 6B

In Example 6B, prior to the esterification step (S2), 5 mL of 1-propanol was added as the alcohol in place of 5 mL of ethanol, and the other conditions were the same as those of Example 1. In Example 6B also, the extraction step (S1) and the esterification step (S2) were performed and a liquid removed from the upper organic solvent phase (hexane phase) was analyzed by GC-MS, in the same manner as described in Example 1.

Example 6C

In Example 6C, prior to the esterification step (S2), 5 mL of 1-butanol was added as the alcohol in place of 5 mL of ethanol, and the other conditions were the same as those of Example 1. In Example 6C also, the extraction step (S1) and the esterification step (S2) were performed and a liquid removed from the upper organic solvent phase (hexane phase) was analyzed by GC-MS, in the same manner as described in Example 1.

[Results]

Figure 18:
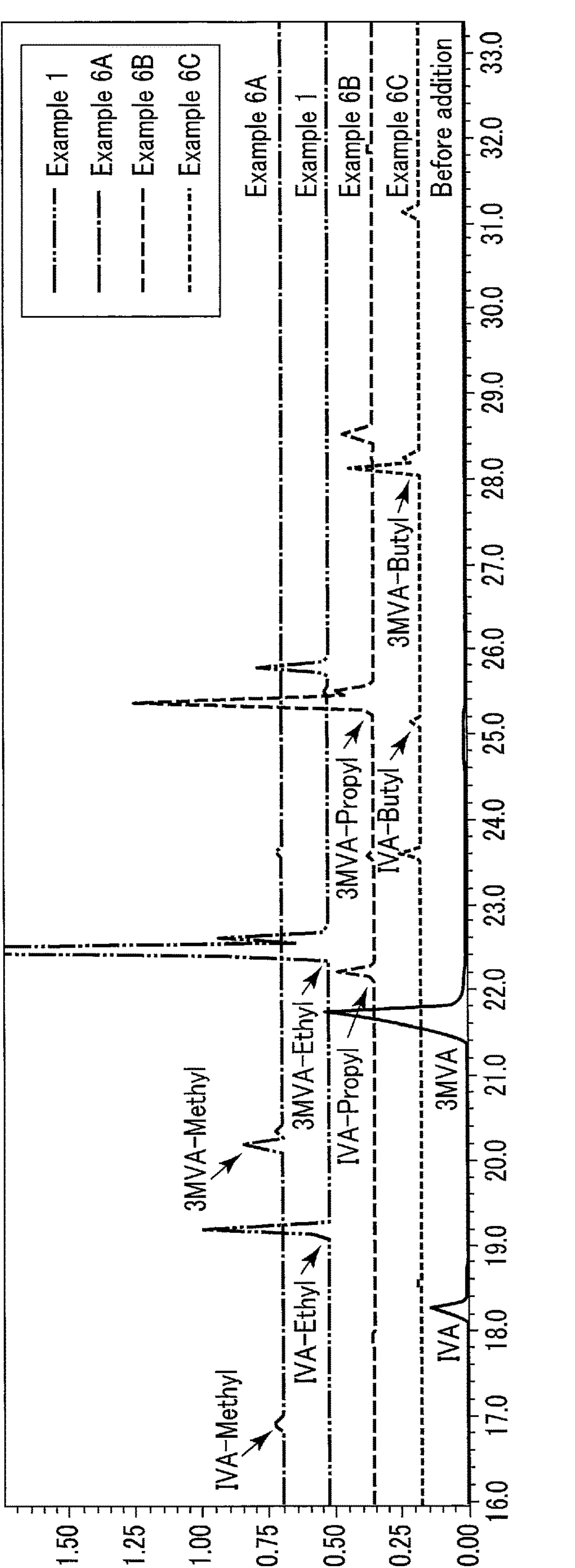
FIG. 18 is a graph showing the results of GC-MS of Examples 6A to 6C, in which valeric acids and hexanoic acids originally contained in a starting tobacco material disappeared after an esterification step and various propyl esters and various butyl esters were generated instead.

The results are shown in FIG. 18. In FIG. 18, the lines of Examples 1 and 6A to 6C are shifted in the vertical direction so as not to overlap each other.

In Example 6A (methanol added), the valeric acids and hexanoic acids originally contained in the starting tobacco material disappeared after the esterification step, and various methyl esters (3-methylvaleric acid methyl ester and isovaleric acid methyl ester) were generated instead. In Example 6A, a tobacco flavor liquid or ester compounds with increased amounts of various methyl esters were obtained.

In Example 6B (1-propanol added), the valeric acids and hexanoic acids originally contained in the starting tobacco material disappeared after the esterification step, and various propyl esters (3-methylvaleric acid propyl ester and isovaleric acid propyl ester) were generated instead. In Example 6B, a tobacco flavor liquid or ester compounds with increased amounts of various propyl esters were obtained.

In Example 6C (1-butanol added), the valeric acids and hexanoic acids originally contained in the starting tobacco material disappeared after the esterification step, and various butyl esters (3-methylvaleric acid butyl ester and isovaleric acid butyl ester) were generated instead. In Example 6C, a tobacco flavor liquid or ester compounds with increased amounts of various butyl esters were obtained.

[Discussion]

From the results of Examples 1, and 6A to 6C, it was found that the alcohols added to the aqueous solution prior to the esterification step (S2) were preferably a lower alcohol, a monohydric alcohol, a primary alcohol, and the like.

<Evaluation of Addition Amount of Ethanol>

Example 7A

In Example 7A, prior to the esterification step (S2), 10 mL of ethanol was added as the alcohol in place of 5 mL of ethanol, and the other conditions were the same as those of Example 1. In Example 7A also, the extraction step (S1) and the esterification step (S2) were performed and a liquid removed from the upper organic solvent phase (hexane phase) was analyzed by GC-MS, in the same manner as described in Example 1.

Example 7B

In Example 7B, prior to the esterification step (S2), 3 mL of ethanol was added as the alcohol in place of 5 mL of ethanol, and the other conditions were the same as those of Example 1. In Example 7B also, the extraction step (S1) and the esterification step (S2) were performed and a liquid removed from the upper organic solvent phase (hexane phase) was analyzed by GC-MS, in the same manner as described in Example 1.

Example 7C

In Example 7C, prior to the esterification step (S2), 0.5 mL of ethanol was added as the alcohol in place of 5 mL of ethanol, and the other conditions were the same as those of Example 1. In Example 7C also, the extraction step (S1) and the esterification step (S2) were performed and a liquid removed from the upper organic solvent phase (hexane phase) was analyzed by GC-MS, in the same manner as described in Example 1.

Comparative Example 5

In Comparative Example 5, there was no addition of 5 mL of ethanol to a centrifuge tube prior to the esterification step (S2), and the other conditions were the same as those of Example 1. In Comparative Example 5 also, the extraction step (S1) and the esterification step (S2) were performed and a liquid removed from the upper organic solvent phase (hexane phase) was analyzed by GC-MS, in the same manner as described in Example 1.

[Results]

Figure 19:
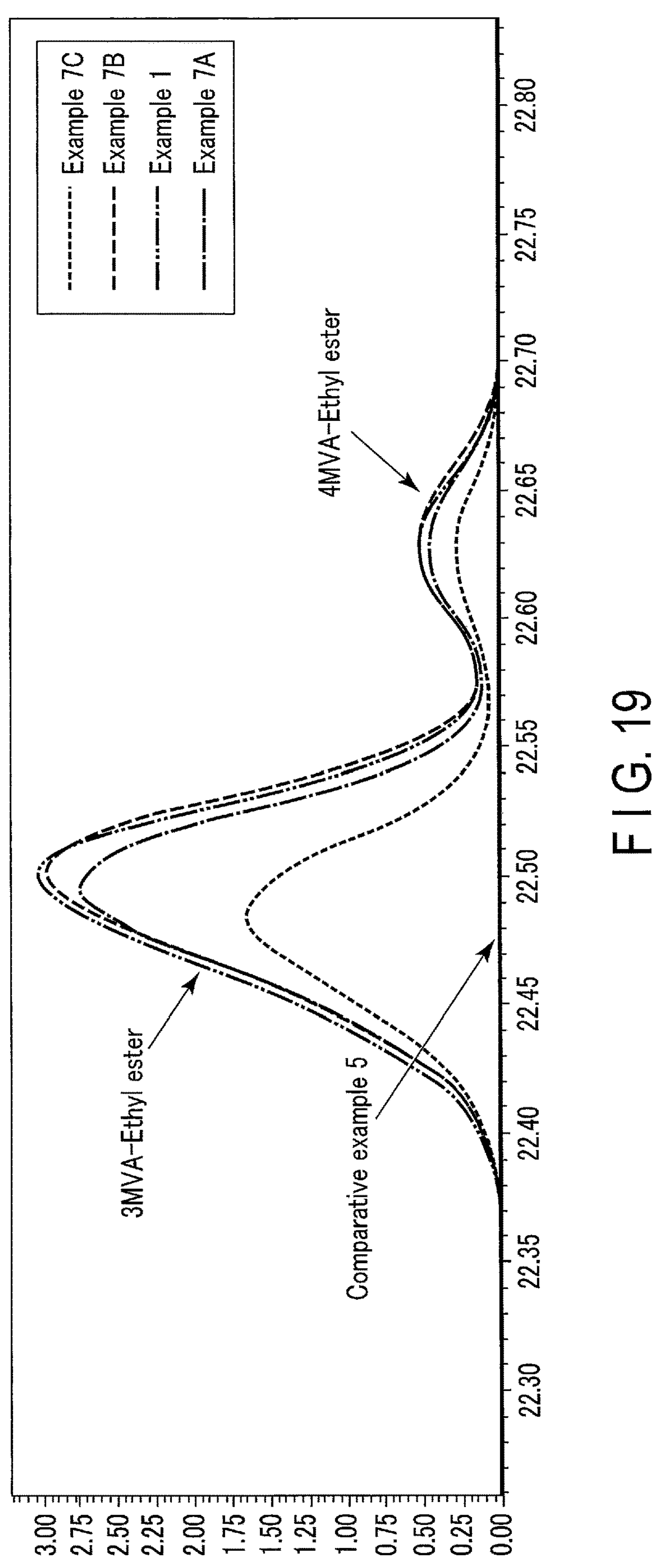
FIG. 19 is a graph showing the results of GC-MS of Examples 7A to 7C, in which valeric acids and hexanoic acids originally contained in a starting tobacco material disappeared after an esterification step and various ethyl esters were generated instead.

The results are shown in FIG. 19.

In both Examples 7A and 7B (10 mL of ethanol and 3 mL of ethanol were added, respectively), the valeric acids and hexanoic acids originally contained in the starting tobacco material disappeared after the esterification step, and various ethyl esters were generated instead, as shown in FIG. 19. Thus, in Examples 7A and 7B, a tobacco flavor liquid or ester compounds with increased amounts of various ethyl esters were obtained. In both Examples 7A and 7B, the amounts of various ethyl esters generated in the esterification step were equivalent to the amounts of various ethyl esters generated in Example 1. Thus, the results of Examples 7A and 7B were approximately the same as those of Example 1.

In Example 7C (0.5 mL of ethanol added), the amounts of the valeric acids and hexanoic acids originally contained in the starting tobacco material decreased after the esterification step, and various ethyl esters were generated instead. Thus, in Example 7C, a tobacco flavor liquid or ester compounds with increased amounts of various ethyl esters were obtained. In Example 7B, however, the amounts of various ethyl esters generated in the esterification step were about 55% of the amounts of various ethyl esters generated in Example 1.

In Comparative Example 5 (no addition of ethanol), various ethyl esters were not formed, but the amounts of various valeric acids and hexanoic acids decreased, as shown in FIG. 19.

[Discussion]

From the results of Examples 1, and 7A to 7C, it was found that the amount of alcohol (ethanol) contained in the aqueous solution was preferably 0.5 mL to 10.0 mL in the esterification step (S2). It was thus found that a proportion of the volume of the alcohol in the total of the volume of the tobacco component-containing liquid and the volume of the aqueous solution was preferably 2.0% to 28.6%.

Alternatively, it was found that the amount of alcohol (ethanol) added as the aqueous solution was more preferably 3.0 mL to 10.0 mL in the esterification step (S2). It was thus found that a proportion of the volume of the alcohol in the total of the volume of the tobacco component-containing liquid and the volume of the aqueous solution was preferably 10.7% to 28.6%.

In Example 7C, although various ethyl esters were generated, the generation amounts thereof were smaller than those of Example 1; therefore, it is considered that the liquid amount of alcohol (ethanol) in the mixed solution in the esterification step (S2) was small and the reaction proceeded slowly.

<Evaluation of Reaction Time in Esterification Step>

Example 8A

In Example 8A, the shaking time of the centrifuge tube containing the mixed solution was set to 40 minutes instead of 60 minutes in the esterification step (S2). The other conditions were the same as those of Example 1. In Example 8A also, the extraction step (S1) and the esterification step (S2) were performed and a liquid removed from the upper organic solvent phase (hexane phase) was analyzed by GC-MS, in the same manner as described in Example 1.

Example 8B

In Example 8B, the shaking time of the centrifuge tube containing the mixed solution was set to 30 minutes instead of 60 minutes in the esterification step (S2). The other conditions were the same as those of Example 1. In Example 8B also, the extraction step (S1) and the esterification step (S2) were performed and a liquid removed from the upper organic solvent phase (hexane phase) was analyzed by GC-MS, in the same manner as described in Example 1.

Example 8C

In Example 8C, the shaking time of the centrifuge tube containing the mixed solution was set to 20 minutes instead of 60 minutes in the esterification step (S2). The other conditions were the same as those of Example 1. In Example 8C also, the extraction step (S1) and the esterification step (S2) were performed and a liquid removed from the upper organic solvent phase (hexane phase) was analyzed by GC-MS, in the same manner as described in Example 1.

Example 8D

In Example 8D, the shaking time of the centrifuge tube containing the mixed solution was set to 10 minutes instead of 60 minutes in the esterification step (S2). The other conditions were the same as those of Example 1. In Example 8D also, the extraction step (S1) and the esterification step (S2) were performed and a liquid removed from the upper organic solvent phase (hexane phase) was analyzed by GC-MS, in the same manner as described in Example 1.

Example 8E

In Example 8E, the shaking time of the centrifuge tube containing the mixed solution was set to 5 minutes instead of 60 minutes in the esterification step (S2). The other conditions were the same as those of Example 1. In Example 8E also, the extraction step (S1) and the esterification step (S2) were performed and a liquid removed from the upper organic solvent phase (hexane phase) was analyzed by GC-MS, in the same manner as described in Example 1.

Example 8F

In Example 8F, the shaking time of the centrifuge tube containing the mixed solution was set to 1 minute instead of 60 minutes in the esterification step (S2). The other conditions were the same as those of Example 1. In Example 8F also, the extraction step (S1) and the esterification step (S2) were performed and a liquid removed from the upper organic solvent phase (hexane phase) was analyzed by GC-MS, in the same manner as described in Example 1.

Example 8G

In Example 8G, the centrifuge tube containing the mixed solution was not shaken in the esterification step (S2) but instead allowed to stand to cause reaction to occur for several seconds. The other conditions were the same as those of Example 1. In Example 8G also, the extraction step (S1) and the esterification step (S2) were performed and a liquid removed from the upper organic solvent phase (hexane phase) was analyzed by GC-MS, in the same manner as described in Example 1.

[Results]

Figure 20:
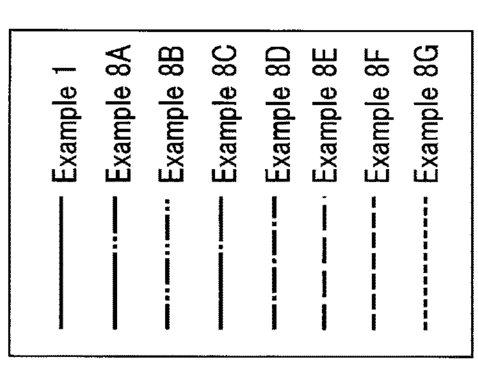
FIG. 20 is a graph showing the results of GC-MS of Examples 8A to 8G, in which valeric acids and hexanoic acids originally contained in a starting tobacco material disappeared after an esterification step and various ethyl esters were generated instead.
Figure 20:
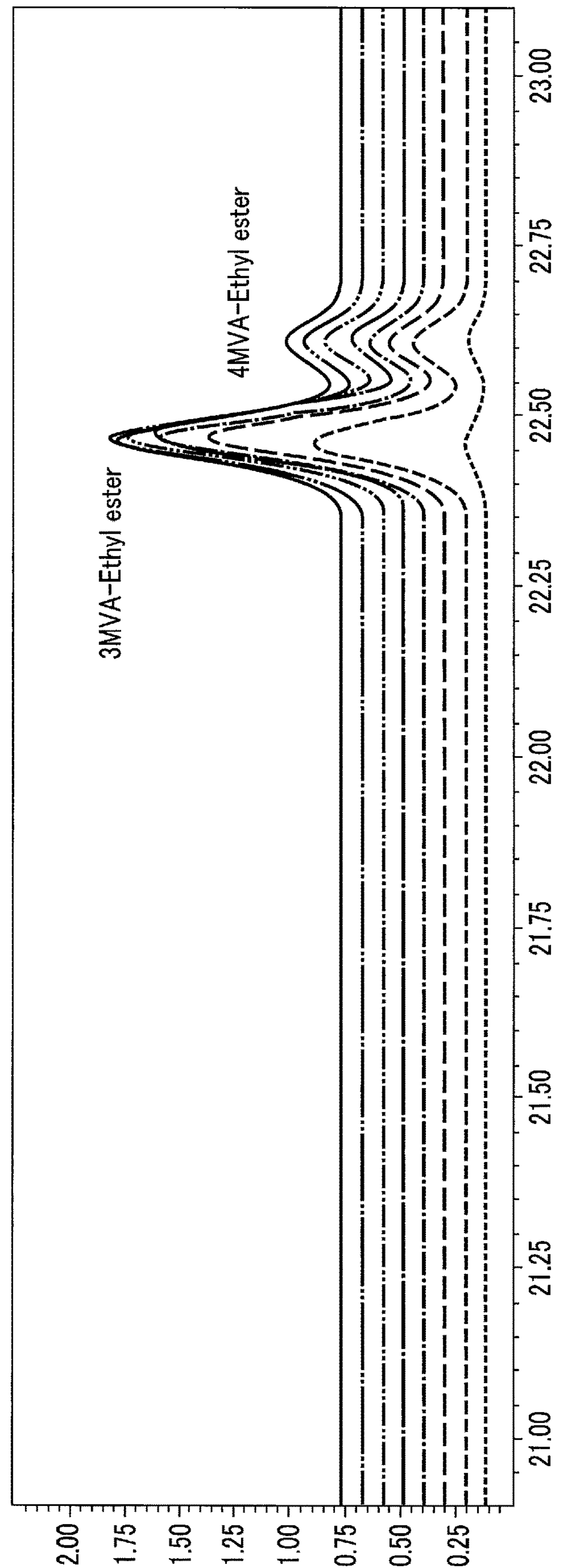

The results are shown in FIGS. 20 and 21. In FIG. 20, the lines of Examples 1 and 8A to 8G are shifted in the vertical direction so as not to overlap each other.

In Examples 8A to 8E (shaking performed for 40 to 5 minutes), various ethyl esters were generated in amounts equivalent to those of Example 1. In Examples 8A to 8E, a tobacco flavor liquid or ester compounds with increased amounts of various ethyl esters were obtained.

In Example 8F (shaking performed for 1 minute), various ethyl esters having a mass corresponding to about 70% of the mass of the various ethyl esters generated in Example 1 were generated. In Example 8F, a tobacco flavor liquid or ester compounds with increased amounts of various ethyl esters were obtained.

In Example 8G (no shaking performed), various ethyl esters having a mass corresponding to about 10% of the mass of the various ethyl esters generated in Example 1 were generated. In Example 8G, a tobacco flavor liquid or ester compounds with increased amounts of various ethyl esters were obtained.

[Discussion]

From the results of Examples 8A to 8F, it was found that the reaction (shaking) in the esterification step (S2) was preferably performed over a period of 1 minute or more, more preferably performed over a period of 1 to 60 minutes, and still more preferably performed over a period of 5 to 60 minutes.

REFERENCE SIGNS LIST

11. Heating-type flavor inhaler
12. Tobacco filler
13. Housing
14. Suction port
15. Aerosol source storage
16. Battery
17. Control circuit
18. Cartridge
21. Vent hole
22. Tobacco flavor source
23. Wick
24. Heater
25. Guide path
26. Power line

What is claimed is:

1. A method for producing a tobacco flavor liquid, the method comprising:

obtaining a tobacco component-containing liquid by extracting a component from a starting tobacco material using an organic solvent; and obtaining a tobacco flavor liquid with an increased concentration of a tobacco component-derived ester compound by (i) mixing the tobacco component-containing liquid with an aqueous solution comprising a basic substance and an alcohol in an oxygen-containing atmosphere, and (ii) reacting the tobacco component-containing liquid with the aqueous solution in the mixture, wherein the organic solvent included in the tobacco component-containing liquid is immiscible with the aqueous solution.

2. The method according to claim 1, wherein the reaction is performed at 0° C. to 90° C.

3. The method according to claim 1, wherein the aqueous solution is a mixed solution of a water solution of the basic substance and the alcohol, and the water solution of the basic substance has a pH of 11.0 to 14.0.

4. The method according to claim 1, wherein the basic substance is a hydroxide of an alkali metal or an alkaline earth metal.

5. The method according to claim 1, wherein the basic substance is strongly basic.

6. The method according to claim 1, wherein the aqueous solution is a mixed solution of a water solution of the basic substance and the alcohol, and the basic substance is present in the water solution of the basic substance at a concentration of 0.01 N to 5 N.

7. The method according to claim 1, wherein a proportion of a volume of the alcohol in a total of a volume of the tobacco component-containing liquid and a volume of the aqueous solution is 2.0% to 28.6%.

8. The method according to claim 1, wherein the reaction is performed over a period of 1 to 60 minutes.

9. The method according to claim 1, wherein the reaction is performed while shaking.

10. A tobacco flavor liquid produced by the method for producing a tobacco flavor liquid according claim 1.

11. A smoking article comprising the tobacco flavor liquid according to claim 10.

12. The method according to claim 1, wherein the mixing step is an esterification step of generating the ester compound through the reaction between the tobacco component-containing liquid and the aqueous solution to thereby obtain the tobacco flavor liquid with the increased amount of ester compound.

13. A method for producing an ester compound, the method comprising:

obtaining a tobacco component-contain liquid by extracting a component from a starting tobacco material using an organic solvent; and obtaining a tobacco flavor liquid with an increased concentration of a tobacco component-derived ester compound by reacting the tobacco component-containing liquid with an aqueous solution comprising a basic substance and an alcohol in an oxygen-containing atmosphere; and separating the ester compound from the tobacco flavor liquid, wherein the organic solvent included in the tobacco component-containing liquid is immiscible with the aqueous solution.

* * * * *